US012720320B2

(12) United States Patent
Attanasio et al.

(10) Patent No.: US 12,720,320 B2
(45) Date of Patent: Aug. 25, 2026

(54) METHODS, DEVICES RELATING TO LAWFUL INTERCEPTION

(71) Applicant: Telefonaktiebolaget LM Ericsson (PUBL), Stockholm (SE)

(72) Inventors: Francesco Attanasio, Roccapiemonte (IT); Giuseppe Celozzi, Naples (IT); Daniele Gaito, Pagani (IT)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 212 days.

(21) Appl. No.: 18/832,614

(22) PCT Filed: Jan. 28, 2022

(86) PCT No.: PCT/EP2022/052111
§ 371 (c)(1),
(2) Date: Jul. 24, 2024

(87) PCT Pub. No.: WO2023/143738
PCT Pub. Date: Aug. 3, 2023

(65) Prior Publication Data

US 2025/0386199 A1 Dec. 18, 2025

(51) Int. Cl.
*H04W 12/80* (2021.01)
*H04W 4/90* (2018.01)

(52) U.S. Cl.
CPC ............. *H04W 12/80* (2021.01); *H04W 4/90* (2018.02)

(58) Field of Classification Search
CPC ................................ H04W 12/80; H04W 4/90
(Continued)

(56) References Cited

U.S. PATENT DOCUMENTS 10,931,696 B2 * 2/2021 Kuppanna ........... H04L 63/1441
2013/0196630 A1 * 8/2013 Ungvari ................ H04W 48/02 455/411
(Continued)

FOREIGN PATENT DOCUMENTS

CN 100583786 C * 1/2010
CN 118633262 A * 9/2024 ............. H04W 4/90
(Continued)

OTHER PUBLICATIONS

Chen et al., "Exploring the Optimal Intercept Access Point Placement Problem in Software-Defined Networks," 2021 IEEE 18th Annual Consumer Communications & Networking Conference (CCNC), Las Vegas, NV, USA, 2021, pp. 1-6, doi: 10.1109/CCNC49032.2021.9369594. (Year: 2021).*
(Continued)

*Primary Examiner* — Peter C Shaw
(74) *Attorney, Agent, or Firm* — Baker Botts L.L.P.

(57) ABSTRACT

A Lawful Interception Administration Function device (102) comprising a memory and a processor, the memory containing instructions which when executed on the processor, cause the LI ADMF device (102) to send to a Network Repository Function (110) a discovery request message for discovering at least one NEF device (103) and at least one Application Function, AF, device (107) served by the NEF device; receive a discovery response message comprising information about the NEF device and the AF device; receive from a LEA (101) a first request message for subscribing to a notification of the event provided by the AF device, the application identified by an identifier; send a second request message, to a NEF device comprising an IRI-POI (104) to subscribe to the notification of the event, the NEF device identified based on the information comprised in the discovery response message; and receive a
(Continued)

subscribe response message confirming the subscription to the notification of the event.

18 Claims, 13 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 2020/0322821 | A1 | 10/2020 | Lee et al. | |
| 2021/0144184 | A1* | 5/2021 | Wong | H04L 65/1069 |
| 2025/0278478 | A1* | 9/2025 | Avdal | G06F 21/554 |

FOREIGN PATENT DOCUMENTS

| | | | | |
|---|---|---|---|---|
| DE | 102021211176 A1 * | 6/2022 | H04L 63/10 |
| WO | WO-2019147435 A1 * | 8/2019 | H04W 12/80 |
| WO | WO-2020071972 A1 * | 4/2020 | H04L 63/30 |
| WO | WO-2020143917 A1 * | 7/2020 | H04W 12/80 |
| WO | WO-2021126020 A1 * | 6/2021 | H04W 12/80 |
| WO | WO-2021151497 A1 * | 8/2021 | H04W 12/80 |

OTHER PUBLICATIONS

Karpagavinayagam et al., "Monitoring Architecture for Lawful Interception in VoIP Networks," Second International Conference on Internet Monitoring and Protection (ICIMP 2007), San Jose, CA, USA, 2007, pp. 5-5, doi: 10.1109/ICIMP.2007.27. (Year: 2007).*

Spalt, "Current challenges for lawful interception (LI)," Telecommunications: The Infrastructure for the 21st Century, Vienna, Austria, 2010, pp. 1-6. (Year: 2010).*

Khelif et al., "Towards a Breakthrough Speaker Identification Approach for Law Enforcement Agencies: SIIP," 2017 European Intelligence and Security Informatics Conference (EISIC), Athens, Greece, 2017, pp. 32-39, doi: 10.1109/EISIC.2017.14. (Year: 2017).*

3GPP TS 29.517 v17.4.0 (Dec. 2021) 3rd Generation Partnership Project; Technical Specification Group Core Network and Terminals; 5G System; Application Function Event Exposure Service; Stage 3 (Release 17).

3GPP TS 33.127 v17.3.0 (Dec. 2021) 3rd Generation Partnership Project; Technical Specification Group Services and System Aspects; Security; Lawful Interception (LI) architecture and functions (Release 17).

PCT Notification of Transmittal of the International Preliminary Report on Patentability issued for International application No. PCT/EP2022/052111—May 7, 2024.

PCT International Search Report issued for International application No. PCT/EP2022/052111—Sep. 26, 2022.

PCT Written Opinion of the International Preliminary Examining Authority issued for International application No. PCT/EP2022/052111—Jan. 18, 2024.

PCT Written Opinion of the International Searching Authority issued for International application No. PCT/EP2022/052111—Sep. 26, 2022.

ETSI TS 103 280 v2.7.1 (Nov. 2021), Technical Specification, Lawful Interception (LI); Dictionary for common parameters.

ETSI TS 103 120 v1.10.1 (Dec. 2021), Technical Specification, Lawful Interception (LI); Interface for warrant information.

3GPP TS 29.503 v17.4.0 (Sep. 2021) 3rd Generation Partnership Project; Technical Specification Group Core Network and Terminals; 5G System; Unified Data Management Services; Stage 3 (Release 17).

3GPP TS 33.127 v16.2.0 (Dec. 2019) 3rd Generation Partnership Project; Technical Specification Group Services and System Aspects; Security; Lawful Interception (LI) architecture and functions (Release 16).

3GPP TS 23.682 v17.2.0 (Dec. 2021); 3rd Generation Partnership Project; Technical Specification Group Services and System Aspects; Architecture enhancements to facilitate communications with packet data networks and applications (Release 17).

3GPP TS 29.501 v17.4.1 (Dec. 2021) 3rd Generation Partnership Project; Technical Specification Group Core Network and Terminals; 5G System; Principles and Guidelines for Services Definition; Stage 3 (Release 17).

3GPP TS 29.523 v17.5.0 (Dec. 2021) 3rd Generation Partnership Project; Technical Specification Group Core Network and Terminals; 5G System; Policy Control Event Exposure Service; Stage 3 (Release 17).

3GPP TS 29.571 v17.1.0 (Mar. 2021) 3rd Generation Partnership Project; Technical Specification Group Core Network and Terminals; 5G System; Common Data Types for Services Based Interfaces; Stage 3 (Release 17).

ETSI GR MEC 022 v2.1.1 (Sep. 2018), Group Report, Multi-access Edge Computing (MEC); Study on MEC Support for V2X User Cases.

ETSI TS 103 221-1 v1.10.1 (Dec. 2021), Technical Specification; Lawful Interception (LI); Internal Network Interfaces; Part 1: X1.

ETSI TS 103 221-2 v1.5.2 (Oct. 2021), Technical Specification, Lawful Interception (LI); Internal Network Interfaces; Part 2: X2/X3.

3GPP TS 23.003 v16.2.0 (Mar. 2020) 3rd Generation Partnership Project; Technical Specification Group Core Network and Terminals; Numbering, addressing and identification (Release 16).

3GPP TS 23.501 V17.2.0 (Sep. 2021) 3rd Generation Partnership Project; Technical Specification Group Services and System Aspects; System architecture for the 5G System (5GS); Stage 2 (Release 17).

3GPP TS 29.122 V16.5.0 (Mar. 2020); 3rd Generation Partnership Project; Technical Specification Group Core Network and Terminals; T8 reference point for Northbound APIs; (Release 16).

3GPP TS 29.500 V16.2.1 (Jan. 2020) 3rd Generation Partnership Project; Technical Specification Group Core Network and Terminals; 5G System; Technical Realization of Service Based Architecture; Stage 3 (Release 16).

3GPP TS 23.288 V16.3.0 (Mar. 2020), 3rd Generation Partnership Project; Technical Specification Group Services and System Aspects; Architecture enhancements for 5G System (5GS) to support network data analytics services (Release 16).

3GPP TS 23.502 V17.2.1 (Sep. 2021) 3rd Generation Partnership Project; Technical Specification Group Services and System Aspects; Procedures for the 5G System (5GS); Stage 2 (Release 17).

ETSI TS 103 221-2 V1.4.1 (Apr. 2021) Technical Specification, Lawful Interception (LI); Internal Network Interfaces; Part 2: X2/X3.

3GPP TS 29.517 V17.3.0 (Sep. 2021); 3rd Generation Partnership Project; Technical Specification Group Core Network and Terminals; 5G System; Application Function Event Exposure Service; Stage 3 (Release 17).

3GPP TS 33.128 V17.2.0 (Sep. 2021); 3rd Generation Partnership Project; Technical Specification Group Services and System Aspects; Security; Protocol and procedures for Lawful Interception (LI); Stage 3 (Release 17).

* cited by examiner

METHODS, DEVICES RELATING TO LAWFUL INTERCEPTION

PRIORITY

This nonprovisional application is a U.S. National Stage Filing under 35 U.S.C. § 371 of International Patent Application Serial No. PCT/EP2022/052111 filed Jan. 28, 2022 and entitled "Methods, Devices Relating to Lawful Interception" which is hereby incorporated by reference in its entirety.

TECHNICAL FIELD

The invention relates to a Lawful Interception Administration Function device, a Network Exposure Function device, an Application Function device, a Mediation and Delivery Function 2 device, their corresponding methods, as well as computer programs, carriers of such computer programs and computer program products comprising computer programs.

BACKGROUND

At the core of most modern networks and services is typically a cloud and virtualization-based platform. This is also the case for Fifth Generation (5G) networks, where the system architecture is defined to support data connectivity and services enabling deployments to use techniques such as Network Function Virtualization (NFV). Additionally, the 5G system architecture leverages on service-based interactions between Control Plane (CP) Network Functions (NF) where identified. A 5G Service Based Architecture (SBA) is centered around services that can register themselves and subscribe to other services. This enables a more flexible development of new services, as it allows to connect to other components without introducing specific new interfaces. The 5G SBA is specified in e.g. 3rd Generation Partnership Project (3GPP) Technical Specification (TS) 3GPP TS 23.502 V17.2.1 (2021 September).

The establishment and management of a Lawful Interception (LI) process is enabled via a Lawful Interception Internal Interface 1 (LI_X1) interface, for the communication between two entities: a Lawful Interception Administration Function (LI ADMF) and a Network Element (NE) performing the interception. Communication over the LI_X1 interface consists of a request followed by a response. Requests may be sent in either direction i.e. with either the LI ADMF or NE initiating the request. The side initiating the request is called the "Requester" while the other side responding is called the "Responder".

Application Function event exposure service in LI scope is completely missing in the 5G LI standards and thus relevant data are missing or incomplete in the LI system for investigation purposes. In particular, the events related to the use of applications running on the UE cannot be monitored presently. There is no provision for an application running on UE to be considered as a target for LI monitoring purposes. There is no means for grouping of applications running on UEs for LI monitoring purposes.

SUMMARY

An object of the invention is to introduce enhancement of the LI standard solution in a wireless communication network, e.g. a 5G network.

To achieve the object, according to a first aspect there is provided a Lawful Interception Administration Function, LI ADMF, device comprising a memory and a processor, the memory containing instructions which when executed on the processor, cause the LI ADMF device to: send to a Network Repository Function, NRF, a discovery request message for discovering at least one Network Exposure Function, NEF, device and at least one Application Function, AF, device served by the NEF device; receive from the NRF, a discovery response message comprising information about the NEF device and information about the AF device, served by the NEF device; receive from a Law Enforcement Agency, LEA, a first request message for subscribing to a notification of at least one event for monitoring at least one application for at least one user equipment, UE, wherein the notification of the event is provided by the AF device and wherein the application is identified by an identifier; send a second request message, to a NEF device which comprises an Intercept Related Information Point of Interception, IRI-POI, to subscribe to the notification of the event, wherein the NEF device is identified based on the information comprised in the discovery response message; and receive a subscribe response message from the NEF device confirming the subscription to the notification of the event.

Hereby is an advantage that the discovery procedure allows for the LI ADMF device to quickly reach a specific AF device, served by the NEF device, communicating with an application of a UE, when the LEA requests for the monitoring of the application identified by the appID.

In an embodiment according to the first aspect, wherein the first request message comprises an LITaskObject comprising a target identifier wherein the target identifier is an application identifier, AppID, identifying an application to be monitored.

In an embodiment according to the first aspect, wherein the first request message comprises an LITaskObject comprising a target identifier wherein the target identifier is a list of application identifiers, AppIDs, each identifying an application to be monitored.

In an embodiment according to the first aspect, wherein the first request message and/or the second request message comprises an EventFilter information comprising an application identifier, AppID, identifying an application to be monitored.

In an embodiment according to the first aspect, wherein the first request message and/or the second request message comprises an EventFilter information comprising a list of application identifiers, AppIDs, each identifying an application to be monitored.

Hereby is achieved, by the inclusion of the ApplicationId in/as the TargetIdentifier, capability for an LI authority to monitor a large number of applications running on at least a UE in a 5G network. Further, the inclusion of the list of ApplicationIds will allow the LEA to perform a selection of which applications are relevant for monitoring and which applications are not relevant for monitoring in a certain PLMN.

In an embodiment according to the first aspect and/or the above two embodiments, wherein the Event Filter information comprises, for identifying an application to be monitored, at least one of: a Generic Public Subscription Identifier, GPSI, a Subscriber Permanent Identifier, SUPI, External Group Identifiers, exterGroupIds, Internal Group Identifiers, interGroupIds, any UE Identifier, anyUeInd and Location Area Identifier, locArea.

In an embodiment according to the first aspect and/or the third, fifth and sixth embodiments, comprising a list of AppIDs for monitoring applications that pose a threat to the UE.

In an embodiment according to the first aspect and/or the third, fifth and sixth embodiments, comprising a list of AppIDs for monitoring applications that are trusted by the UE.

Hereby is achieved the effect of decreasing the amount of data to report to a collection function running at the LEMF, by selecting/grouping specific applications to be monitored.

In an embodiment according to the first aspect and any of the above embodiments, wherein the event for monitoring is at least one of UeCommunication, UeMobility and ServiceExperience.

In an embodiment according to the above embodiment, wherein the UeCommunication is indicated by a feature name UE_COMM that indicates the event related to UE communication information.

In an embodiment according to the above two embodiments, wherein the UeMobility is indicated by a feature name UE_MOBILITY that indicates the event related to UE mobility.

In an embodiment according to the above three embodiments, wherein the ServiceExperience is indicated by a feature name SVC that indicates an event related to service experience.

In an embodiment according to the first aspect and any of the above embodiments, wherein the first request message and the second request message comprises the event for monitoring, the event indicated by the corresponding feature name.

In an embodiment according to the first aspect and any of the above embodiments, wherein the discovery request message comprises a request of type NEF.

In an embodiment according to the first aspect and any of the above embodiments, wherein the information about the NEF device includes at least one of: NEF ID and NEF address.

In an embodiment according to the first aspect and any of the above embodiments, wherein the information about the AF device includes information on whether the AF device is connected to the NEF device.

In an embodiment according to the above embodiment, wherein the information about the AF device includes a list of application identifiers, AppIds, monitored by the AF device that are connected to the NEF device.

In an embodiment according to the first aspect and any of the above embodiments, the memory containing instructions which when executed on the processor, cause the LI ADMF device to: send a subscription request message for subscribing to a notification about a change in status of the NEF device; and receive a subscription response message confirming the subscription to the notification about the change in status.

In an embodiment according to the above embodiment, wherein the subscribe request message is Nnrf_NFManagement_NFStatusSubscribe Request message and the subscribe response message is Nnrf_NFManagement_NFStatusSubscribe Response message.

In an embodiment according to the first aspect and any of the above embodiments, the memory containing instructions which when executed on the processor, cause the LI ADMF device to: receive from a Lawful Interception Mediation and Delivery Function 2, LI MDF2, over a Lawful Interception Internal Interface 1, LI_X1, interface, at least an NEF profile of the NEF device that are to be updated; and update the NEF profile in the LI ADMF.

In an embodiment according to the first aspect and any of the above embodiments, the memory containing instructions which when executed on the processor, cause the LI ADMF device to send the discovery request message over the LI_X1 interface, wherein the discovery request message is a Nnrf_NFDiscovery_Request message.

In an embodiment according to the first aspect and any of the above embodiments, the memory containing instructions which when executed on the processor, cause the LI ADMF device to receive the discovery response message over the LI_X1 interface, wherein the discovery response message is a Nnrf_NFDiscovery_Response message.

In an embodiment according to the first aspect and any of the above embodiments, the memory containing instructions which when executed on the processor, cause the LI ADMF device to receive the first request message over a Lawful Interception Handover Interface 1, LI_HI1, interface, wherein the first request message is a HI1 LI Activation request message.

In an embodiment according to the first aspect and any of the above embodiments, the memory containing instructions which when executed on the processor, cause the LI ADMF device to send the second request message over the LI_X1 interface wherein the first request message is a Nnef_EventExposure_Subscribe Request message.

In an embodiment according to the first aspect and any of the above embodiments, the memory containing instructions which when executed on the processor, cause the LI ADMF device to receive the subscribe response message over the LI_X1 interface wherein the subscribe response message is a Nnef_EventExposure_Subscribe Response message.

According to a second aspect, there is provided a Network Exposure Function, NEF, device comprising an Intercept Related Information Point of Interception, IRI-POI, comprising a memory and a processor, the memory containing instructions which when executed on the processor cause the NEF device to: receive from a Lawful Interception Administration Function, LI ADMF, device, a second request message for subscribing to a notification of at least one event for monitoring at least one application for at least one user equipment, UE, wherein the notification of the event is provided by an Application Function, AF, device and wherein the application is identified by an identifier and wherein the NEF device is identified based on discovery information comprised in the LI ADMF device; send a third request message, to an Application Function, AF, device for subscribing to the notification of the event; and receive from the AF device, a first subscribe response message confirming the subscription to the notification of the event.

In an embodiment according to the second aspect, wherein the event for monitoring is at least one of UeCommunication, UeMobility and ServiceExperience.

In an embodiment according to the second aspect and any of the above embodiments according to the second aspect, wherein the UeCommunication is indicated by a feature name UE_COMM that indicates the event related to UE communication information.

In an embodiment according to the second aspect and any of the above embodiments according to the second aspect, wherein the UeMobility is indicated by a feature name UE_MOBILITY that indicates the event related to UE mobility.

In an embodiment according to the second aspect and any of the above embodiments according to the second aspect, wherein the ServiceExperience is indicated by a feature name SVC that indicates an event related to service experience.

In an embodiment according to the second aspect and any of the above embodiments according to the second aspect, wherein the second request message and the third request message comprises the event for monitoring each event indicated by the corresponding feature name.

In an embodiment according to the second aspect and any of the above embodiments according to the second aspect, wherein the second request message and the third request message comprises the event for monitoring each event indicated by an Event Identifier, Event ID.

In an embodiment according to the second aspect and any of the above embodiments according to the second aspect, the memory containing instructions which when executed on the processor, cause the NEF device to send to the LI ADMF, a second subscribe response message confirming the subscription to the notification of the event.

In an embodiment according to the second aspect and any of the above embodiments according to the second aspect, wherein the third request message comprises a notification endpoint of the NEF device wherein the notification endpoint is one of: an IP address or an IP address with a port address.

In an embodiment according to the second aspect and any of the above embodiments according to the second aspect, wherein the second request message is Nnef_EventExposure_Subscribe Request message.

In an embodiment according to the second aspect and any of the above embodiments according to the second aspect, wherein the third request message is Naf_EventExposure_Subscribe Request message.

In an embodiment according to the second aspect and any of the above embodiments according to the second aspect, wherein the first response message is Naf_EventExposure_Subscribe Response message.

According to a third aspect there is provided an Application Function, AF, device comprising a memory and a processor, the memory containing instructions which when executed on the processor, cause the AF device to: receive from a Network Exposure Function, NEF, device comprising an Intercept Related Information Point of Interception, IRI-POI, a third request message for subscribing to a notification of at least one event for monitoring at least one application for at least one user equipment, UE, wherein the notification of the event is provided by the AF device and wherein the application is identified by an identifier; and send to the NEF device, a subscribe response message confirming the subscription to the notification of the event of the AF device.

In an embodiment according to the third aspect, the memory containing instructions which when executed on the processor cause the AF device to: authorize the request for subscription of the event; and store an association of an identity of the requester and an event trigger; In an embodiment according to the third aspect and any of the above embodiments according to the third aspect, wherein the event for monitoring is at least one of: UeCommunication, UeMobility and ServiceExperience.

In an embodiment according to the third aspect and any of the above embodiments according to the third aspect, wherein the UeCommunication is indicated by a feature name UE_COMM that indicates the event related to UE communication information.

In an embodiment according to the third aspect and any of the above embodiments according to the third aspect, wherein the UeMobility is indicated by a feature name UE_MOBILITY that indicates the event related to UE mobility.

In an embodiment according to the third aspect and any of the above embodiments according to the third aspect, wherein the ServiceExperience is indicated by a feature name SVC that indicates an event related to service experience.

In an embodiment according to the third aspect and any of the above embodiments according to the third aspect, wherein the third request message comprises the event for monitoring each event indicated by the corresponding feature name.

In an embodiment according to the third aspect and any of the above embodiments according to the third aspect, wherein the third request message comprises the event for monitoring each event indicated by an Event Identifier, Event ID.

In an embodiment according to the third aspect and any of the above embodiments according to the third aspect, wherein the third request message is Naf_EventExposure_Subscribe Request message.

In an embodiment according to the third aspect and any of the above embodiments according to the third aspect, wherein the subscribe response message is Naf_EventExposure_Subscribe Response message.

According to a fourth aspect, there is provided an Application Function, AF, device comprising a memory and a processor, the memory containing instructions which when executed on the processor, cause the AF device to: detect at least one event for monitoring at least one application for at least one user equipment, UE, wherein the application is identified by an identifier; and send to a Network Exposure Function, NEF, device a first notify message notifying the detection of the event, wherein the first notify message comprises an event report of each of the detected event.

According to a fifth aspect, there is provided a Network Exposure Function, NEF, device comprising an Intercept Related Information Point of Interception, IRI-POI, comprising a memory and a processor, the memory containing instructions which when executed on the processor, cause the NEF device to: receive from an Application Function, AF, device a first notify message notifying the detection of at least one event subscribed by the NEF for monitoring at least one application for one or more user equipment, UE, wherein the application is identified by an identifier and wherein the first notify message comprises an event report; and send to a Mediation and Delivery Function 2, a second notify message comprising the event report.

According to a sixth aspect, there is provided a Mediation and Delivery Function 2, MDF2, device comprising a memory and a processor, the memory containing instructions which when executed on the processor, cause the MDF2 device to: receive from a Network Exposure Function, NEF, device a second notify message notifying the detection of at least one event for monitoring at least one application for at least one user equipment, UE, wherein the application is identified by an identifier and wherein the second notify message comprises the event report; convert an event information comprised in the event report into a standard format; and send, via the Lawful Interception Handover Interface 2, LI_HI2, interface, the converted event information comprised in the event report to a LEMF.

In an embodiment according to the fourth, fifth and sixth aspects, wherein the event for monitoring is at least one of: UeCommunication, UeMobility and ServiceExperience.

In an embodiment according to the fourth, fifth and sixth aspects, wherein the UeCommunication is indicated by a feature name UE_COMM that indicates the event related to UE communication information.

In an embodiment according to the fourth, fifth and sixth aspects, wherein the UeMobility is indicated by a feature name UE_MOBILITY that indicates the event related to UE mobility.

In an embodiment according to the fourth, fifth and sixth aspects, wherein the ServiceExperience is indicated by a feature name SVC that indicates an event related to service experience.

In an embodiment according to the fourth, fifth and sixth aspects, wherein the event report, in case of the UeCommunication, comprises the following:

- application identifier, AppID, or a list of AppIDs, identifying the application;
- Timestamp indicating the time at which an event is observed;
- Subscriber Permanent Identifier, SUPI, identify a UE;
- exterGroupId identifying an external group of UEs;
- interGroupId identifying an internal group of UEs;
- comms indicating a list of communication information.

In an embodiment according to the fourth, fifth and sixth aspects, wherein the event report, in case of the UeMobility, comprises the following:

- application identifier, AppID, or a list of AppIDs, identifying the application;
- Timestamp indicating the time at which an event is observed;
- Subscriber Permanent Identifier, SUPI, identifying a UE;
- ueTrajs identifying a list of UE moving trajectories In an embodiment according to the fourth, fifth and sixth aspects, wherein the event report, in case of the SVC, comprises the following:

- application identifier, AppID, or a list of AppIDs, identifying the application;
- svcExpPerFlows indicating service experience for each service flow;
- Subscriber Permanent Identifier, SUPI, identifying a UE;
- Generic Public Subscription Identifier, GPSI, identifying external UE identifier.

According to a seventh aspect, there is provided a method performed by a Lawful Interception Administration Function, LI ADMF, device. The method comprises sending to a Network Repository Function, NRF, a discovery request message for discovering at least one Network Exposure Function, NEF, device and at least one Application Function, AF, device served by the NEF device. The method comprises receiving from the NRF, a discovery response message comprising information about the NEF device and information about the AF device, served by the NEF device. The method comprises receiving from a Law Enforcement Agency, LEA, a first request message for subscribing to a notification of at least one event for monitoring at least one application for at least one user equipment, UE, wherein the notification of the event is provided by the AF device and wherein the application is identified by an identifier. The method comprises sending a second request message, to a NEF device which comprises an Intercept Related Information Point of Interception, IRI-POI, to subscribe to the notification of the event, wherein the NEF device is identified based on the information comprised in the discovery response message. The method comprises receiving a subscribe response message from the NEF device confirming the subscription to the notification of the event In one or more embodiments of the seventh aspect, the method performed by the ADMF device comprises any of the features of any one of the embodiments of the first aspect.

According to an eighth aspect, there is provided a method performed by a Network Exposure Function, NEF, device. The method comprises receiving from a Lawful Interception Administration Function, LI ADMF, device, a second request message for subscribing to a notification of at least one event for monitoring at least one application for at least one user equipment, UE, wherein the notification of the event is provided by an Application Function, AF, device and wherein the application is identified by an identifier and wherein the NEF device is identified based on discovery information comprised in the LI ADMF device. The method comprises sending a third request message, to an Application Function, AF, device for subscribing to the notification of the event. The method comprises receiving from the AF device, a first subscribe response message confirming the subscription to the notification of the event.

In one or more embodiments of the eighth aspect, the method performed by the NEF device comprises any of the features of any one of the embodiments of the second aspect.

According to a ninth aspect, there is provided a method performed by an Application Function, AF, device. The method comprises receiving from a Network Exposure Function, NEF, device comprising an Intercept Related Information Point of Interception, IRI-POI, a third request message for subscribing to a notification of at least one event for monitoring at least one application for at least one user equipment, UE, wherein the notification of the event is provided by the AF device and wherein the application is identified by an identifier. The method comprises sending to the NEF device, a subscribe response message confirming the subscription to the notification of the event of the AF device.

In one or more embodiments of the ninth aspect, the method performed by the AF device comprises any of the features of any one of the embodiments of the third aspect.

According to a tenth aspect, there is a provided a method performed by an Application Function, AF, device. The method comprises detecting at least one event for monitoring at least one application for at least one user equipment, UE, wherein the application is identified by an identifier. The method comprises sending to a Network Exposure Function, NEF, device a first notify message notifying the detection of the event, wherein the first notify message comprises an event report of each of the detected event.

In one or more embodiments of the tenth aspect, the method performed by the AF device comprises any of the features of any one of the embodiments of the fourth aspect.

According to an eleventh aspect, there is provided a method performed by a Network Exposure Function, NEF, device. The method comprises receiving from an Application Function, AF, device a first notify message notifying the detection of at least one event subscribed by the NEF for monitoring at least one application for one or more user equipment, UE, wherein the application is identified by an identifier and wherein the first notify message comprises an event report. The method comprises sending to a Mediation and Delivery Function 2, a second notify message comprising the event report.

In one or more embodiments of the eleventh aspect, the method performed by the NEF device comprises any of the features of any one of the embodiments of the fifth aspect.

According to a twelfth aspect, there is a method performed by a Mediation and Delivery Function 2, MDF2, device. The method comprises receiving from a Network Exposure Function, NEF, device a second notify message notifying the detection of at least one event for monitoring at least one application for at least one user equipment, UE, wherein the application is identified by an identifier and wherein the second notify message comprises the event report. The method comprises converting an event information comprised in the event report into a standard format. The method comprises sending, via the Lawful Interception Handover Interface 2, LI_HI2, interface, the converted event information comprised in the event report to a LEMF.

In one or more embodiments of the twelfth aspect, the method performed by the MDF2 device comprises any of the features of any one of the embodiments of the sixth aspect.

According to a thirteenth aspect there is provided a computer program, comprising instructions which, when executed on a Lawful Interception Administration Function, LI ADMF, device, cause the LI ADMF device to carry out the method according to any of embodiments according to the seventh aspect.

According to a fourteenth aspect there is provided a carrier containing the computer program according to the thirteenth aspect, wherein the carrier is one of an electronic signal, optical signal, radio signal, or computer-readable storage medium.

According to a fifteenth aspect there is provided a Computer program product comprising a computer readable storage means on which the computer program according to the thirteenth aspect is stored.

According to a sixteenth aspect there is provided a computer program, comprising instructions which, when executed on a Network Exposure Function, NEF, device cause the NEF device to carry out the method according to any of the embodiments according to the eighth aspect and/or the eleventh aspect.

According to a seventeenth aspect there is provided a carrier containing the computer program according to the sixteenth aspect, wherein the carrier is one of an electronic signal, optical signal, radio signal, or computer-readable storage medium.

According to an eighteenth aspect there is provided a computer program product comprising a computer readable storage means on which the computer program according to the sixteenth aspect is stored.

According to a nineteenth aspect there is provided a computer program, comprising instructions which, when executed on an Application Function, AF, device cause the AF device to carry out the method according to the ninth and/or tenth aspects.

According to a twentieth aspect there is provided a carrier containing the computer program according to nineteenth aspect, wherein the carrier is one of an electronic signal, optical signal, radio signal, or computer-readable storage medium.

According to a twenty-first aspect there is provided a computer program product comprising a computer readable storage means on which the computer program according to the nineteenth aspect is stored.

According to a twenty-second aspect there is provided a computer program, comprising instructions which, when executed on a Mediation and Delivery Function 2, MDF2, device cause the MDF2 device to carry out the method according to any of the embodiments according to the twelfth aspect.

According to a twenty-third aspect there is a provided a carrier containing the computer program according to the twenty second aspect, wherein the cater is one of an electronic signal, optical signal, radio signal, or computer-readable storage medium.

According to a twenty-fourth aspect, there is provided a computer program product comprising a computer readable storage means on which the computer program according to the twenty second aspect is stored.

Further advantage of the invention include that an LEMF could use the above data, eg. AppID or a list of AppIDs, for monitoring purposes. The monitoring purpose may, for example, be for public safety or for monitoring one or more applications that are a threat to a UE or a user of a UE. Another advantage of the invention is enabling the reporting of application-related monitoring events of a UE for investigation purposes. Yet another advantage is that the invention enhances LI investigation capabilities.

BRIEF DESCRIPTION OF THE DRAWINGS

For a better understanding of the disclosure, and to show more readily how it may be carried into effect, reference will now be made, by way of example, to the following drawings, in which.

DETAILED DESCRIPTION

Figure 1:
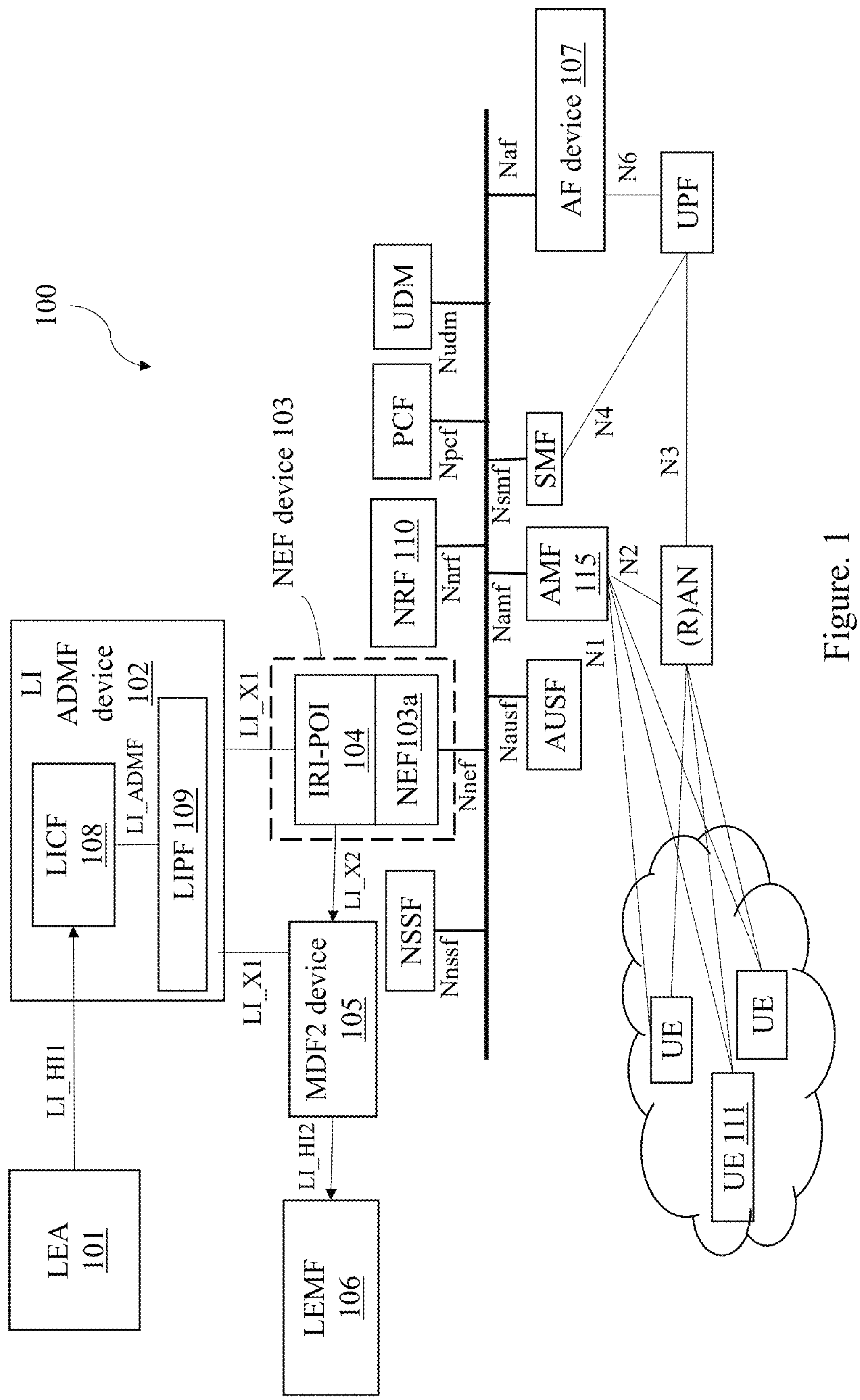
FIG. 1 illustrates an architecture diagram of an LI system used in a 5G network.

FIG. 1 illustrates an architecture diagram of an LI system used in a telecommunication network 100, here in the form of a 5G network. The LI system comprises the LI components such as a Law Enforcement Agency (LEA) 101, an LI ADMF device 102, an LEMF 106, an MDF2 device 105, a NEF device 103 comprising an Intercept Related Information Point of Interception 104 (IRI-POI). The LI system, additionally comprises interfaces such as LI_HI1, LI_HI2, LI_X1 and LI_X2. The NEF device 103 provides monitoring capability of an event for a UE in the 5G network and exposes such monitoring event information via the e.g. NEF 103*a*. In a 5G Service-Based Architecture (SBA) core, the NEF device 103 also provides small data delivery service like the Non-IP Data Delivery (NIDD) service of 4G Service Capability Exposure Function (SCEF) for low power Internet of Things (IoT) devices to be able to communicate with the 5G network. The LEA 101 is responsible for submitting a warrant for lawful interception to a Communications Service Provider (CSP). An LI ADMF device 102, which is responsible for the overall management of the LI functionality, includes the two logical functions: an LI Control Function (LICF) 108 and an LI Provisioning Function (LIPF) 109. The LICF 108 controls the management of the end-to-end life cycle of a warrant. The role of the LIPF 109 varies depending on implementation of network functions and of the LI ADMF device 102 itself (e.g. virtual or non-virtual). In its simplest form, the LIPF 109 is the secure proxy used by the LICF 108 to communicate with POIs, MDFs, e.g. the IRI-POI 104, the MDF2 device 105 or other infrastructure required to operate LI within the telecommunication network 100. The IRI-POI 104 detects a target communication (i.e. communication involving a device associated with a target identity for which LI has been approved), derives the intercept related information (IRI) from the target communication and delivers the POI output as X2 Intercept Related Information (xIRI) to the MDF2 device 105. The IRI-POI 104 may be embedded within a network function (NF), for example the NEF device 103 or separate from a Network Function (NF) with which it is associated. The NEF function, e.g. the NEF 103*a*, performs the functionalities of network exposure and is implemented in the NEF device 103. The MDF2 device 105 delivers the Interception Product to the LEMF 106. The MDF2 device 105 generates the IRI messages from the xIRI and sends them to one or more LEMFs, e.g. the LEMF 106. Lawful interception handover interface (LI HIT) is used to send warrants and other interception request information from the LEA 101 to the CSP that provides the telecommunication network 100. LI_X1 interfaces are used to manage the POIs, e.g. the IRI-POI 104, and triggering functions, and to provision LI target information on the POIs and TFs to intercept target communications. The LI_X2 interface is used to pass the xIRI message from the IRI-POIs, e.g. the IRI-POI 104, to the MDF2 device 105. The LI_HI2 interface is used to send IRI from the MDF2 device 105 to the LEMF 106. This interface is defined in e.g. 3GPP TS 33.128 V17.2.0 (2021-09). The NEF 103 interacts with 5G core network nodes such as Network Function Repository Function (NRF) via the Nnrf interface, Policy Control Function (PCF) via the Npcf interface, Unified Data Management (UDM) via the Nudm interface, Application Function (AF) device 107 via the Naf interface, Network Slice Selection Function (NSSF) via the Nnssf interface, Authentication Server Function (AUSF) via the Nausf interface, Access and Mobility Management Function (AMF) via the Namf interface and Session Management Function (SMF) via the Nsmf interface. The interaction with the core network nodes may, for example, be in relation to subscription to a notification of an event (e.g. Monitoring event, NIDD event). The 5G core network nodes are further connected to the 5G Radio Access Network (RAN). For instance, the AMF 115 is connected to an Access Network (AN), here in the form of a 5G Radio AN, via the N2 interface. The SMF is connected to a User Plane Function (UPF) via the N4 interface. The UPF is further connected to the AN via the N3 interface and to a Data Network (DN) via the N6 interface. End-user devices, here illustrated as UE and IoT UE, are connected to the 5G RAN and the AMF. The AF device 107 comprises one or more functionalities of a typical AF.

Figure 2:
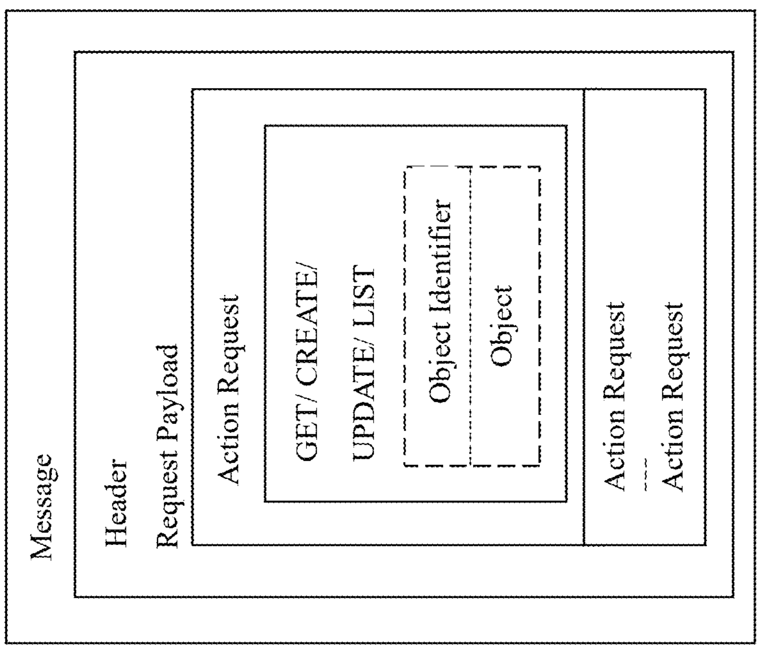
FIG. 2 illustrates an example request message structure.

A request message may, for example, have a structure as shown in FIG. 2. The structure as in FIG. 2 applies to any request message, for example, a first request message, described in the present text. According to FIG. 2, a Message is a Top-level container for one or more HIT messages. A Header contains routing and timestamp information. A Request Payload includes one or more Action Requests. Each Action has a verb such as GET, CREATE, UPDATE or LIST, in the form of a request (also called Action Request). An action (or the Verb or the Action Request) includes an Object Identifier, which identifies the Object being acted on. Depending on the verb, it may also contain an Object. An object may, for example, be a Task Object. A Task Object may, for example, be an LITaskObject. There may be many Action Requests in a Request message. Each Action Request will, generally, act on a separate message.

The first request message may be encoded in, for example, Extensible Markup Language (XML) format according to the Warrant Information (WI) XML Schema Definition (XSD) Schema. Further, the first request message may be sent, for example, in the form of a HTTP POST message. The body of the HTTP POST message may contain a first request message. In the absence of a HTTP transport mechanism in a particular country, a nationally-defined transport mechanism may be used for that country. The content-type of the first request message may, for example, be either text or XML. In an embodiment, caching may not be used in the HTTP configuration.

In some embodiments, a response message, a subscribe response message or an event notification message over the interfaces LI_HI1, LI_X1 or LI_X2 may have a similar message structure as the request message of FIG. 2, wherein the message structure shall be a response message structure.

Figure 3:
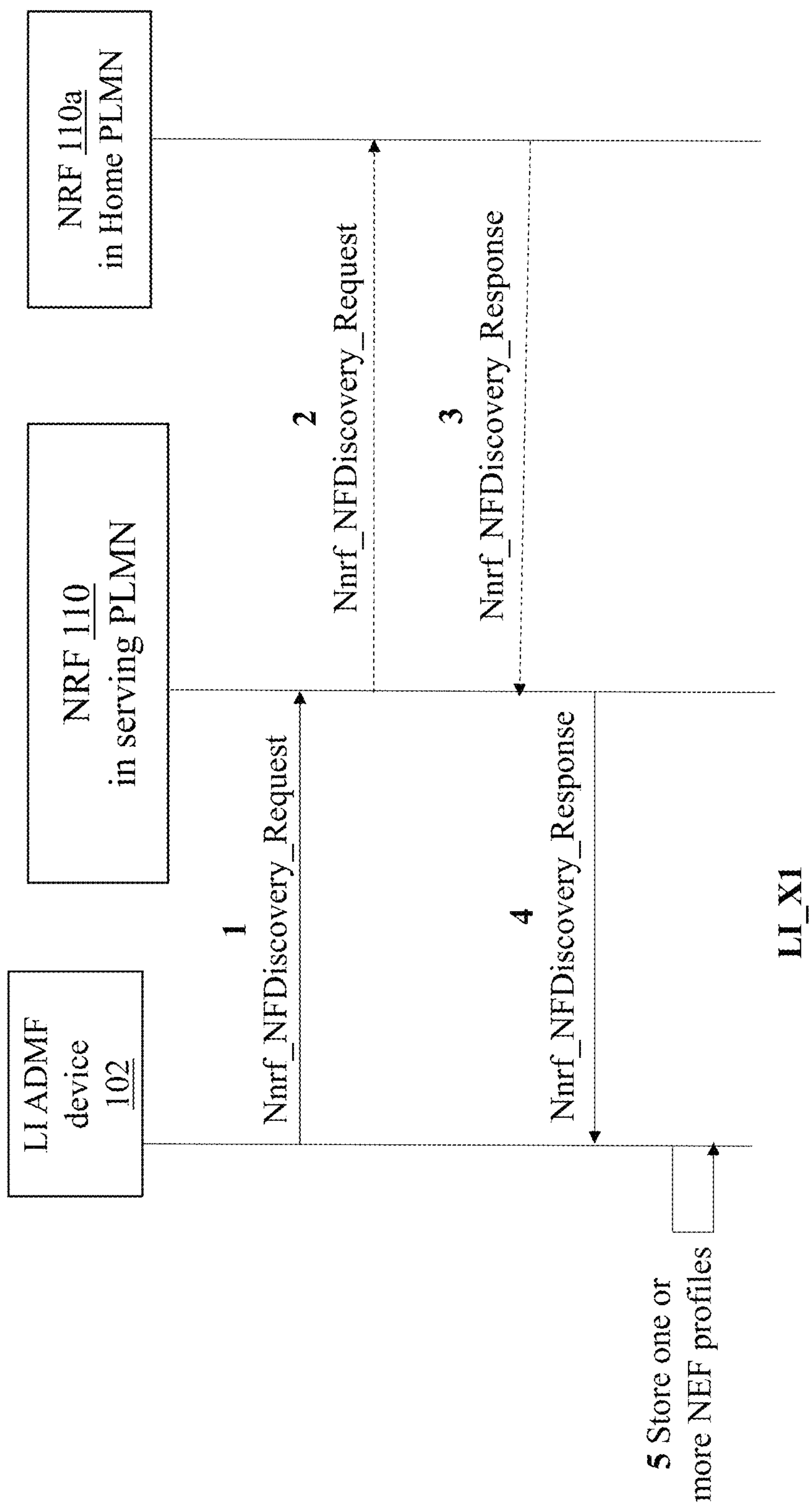
FIG. 3 illustrates a message flow for discovery according to an embodiment of the invention.

FIG. 3 illustrates a flow chart for discovery of the NEF device 103 by the LI ADMF device 102 according to an embodiment of the invention.

The NRF 110 is responsible for storing in its repository information related to one or more NEF devices 103 in a certain PLMN. The NRF 110*a* may further store for each NEF device 103, the one or more application IDs, AppID that are supported. The AppID is an identifier identifying one or more applications of at least a UE. In an embodiment, the AppID is an identifier identifying a list of applications, of at least a UE. The one or more applications may refer to one or more applications to be monitored by an LI node, e.g. the LEA 101.

The LI ADMF device 102 interrogates the NRF 110 to discover automatically at least a NEF device 103 and the AF device 107 served by the NEF device 103 as well as the one or more AppIDs of a target, e.g. the UE 111, managed by the AF device 107. These information enable the LI ADMF device 102 to create a database to be used for monitoring one or more events such as UeMobility, UeCommunication and ServiceExperience. One or more methods described herein are used to implement the monitoring only for specific applications of the UE 111 and for optimal distribution of the corresponding warrants.

As illustrated by arrow 1 of FIG. 3, the LI ADMF device 102 sends a discovery request message to the NRF 110 in a serving PLMN. In an embodiment, the discovery request message is a Nnrf_NFDiscovery_Request message.

The discovery request message comprises a request for requesting information about at least a NEF device 103 and at least the AF device 107 served by the NEF device 103. The request includes an indication of type NEF, to indicate that the information about one or more NEF devices 103 is sought. Each NEF device 103 may comprise one or more NEF instances.

The NFDiscovery operation can be invoked by the NF Service Consumer, e.g. the LI ADMF device 102 or the NRF 110, requesting to discover one or more NEF devices 103 located in the same PLMN or in a different PLMN. When the source NF and target NFs are located in different PLMNs, the source NF is said to be in the "Serving PLMN", and the target NFs (and the NRF where they are registered) are said to be in the "Home PLMN".

The NRF device 110 discovers the one or more NEF devices 103, each represented by their NF Profile. The one or more NEF devices 103 may currently be registered in the NRF device 110 and may satisfy a number of input query parameters.

More specifically, the Nnrf_NFDiscovery_Response message comprises the NEF ID of one or more NEF devices 103, the NEF address of one or more NEF devices 103 and the status information of whether one or more AF devices 107 served by the one or more NEF devices 103 are connected or not. If connected, the message further includes a list of the AF IDs that are connected. In an embodiment, the message comprises one or more AppIDs of the applications. In an embodiment, the message comprises a list of AppIds. The applications may be managed by at least an AF device 107 and/or at least an NEF device 103.

TABLE 1

Data comprised in Nnrf_NFDiscovery_Response message

| Data Type | Clause defined | Description |
|---|---|---|
| NefInfo | 6.1.6.2.48 | Information of an NEF NF Instance. |
| PfdData | 6.1.6.2.49 | List of application IDs (AppId) or one or more AppIds and/or AF IDs managed by a given NEF Instance. |
| AfEventExposureData | 6.1.6.2.50 | AF Event Exposure data managed by a given NEF Instance. |

TABLE 2

Definition of Type NefInfo

| Attribute name | Data type | P | Cardinality | Description |
|---|---|---|---|---|
| nefId | NefId | C | 0 . . . 1 | This IE shall be present and contain the NEF ID of the NEF if NIDD service is supported. |
| pfdData | PfdData | O | 0 . . . 1 | PFD data. The NRF shall return the NEF profiles that have at least one nnef-pfdmanagement service matching the application identifiers and/or Application Function identifiers in the corresponding identifier list.<br>If not included, the NRF shall return all the application identifiers and/or Application Function identifiers registered in the NEF profile. |
| afEeData | AfEventExposureData | O | 0 . . . 1 | The AF provided event exposure data. The NEF registers such information in the NRF on behave of the AF. |

The NF Service Consumer, e.g. the LI ADMF device 102 may send an HTTP GET request to the resource URI "nf-instances" collection resource.

In case of discovery in the same PLMN, the NRF 110 sends to the LI ADMF device the Nnrf_NFDiscovery_Response message, as illustrated by arrow 4.

The Nnrf_NFDiscovery_Response message comprises one or more data according to Tables 1-4 described further below. See 3GPP TS 29.510 V17.4.0 (2021-12) for further details. In particular, the NefInfo can be specified in the NFProfile structure passed to the NRF during the discovery of the one or more NEF devices 103.

TABLE 3

Definition of Type PfdData

| Attribute name | Data type | P | Cardinality | Description |
|---|---|---|---|---|
| appIds | array(string) | O | 1 . . . N | List of internal application identifiers of the managed PFDs. |
| afIds | array(string) | O | 1 . . . N | List of Application Function identifiers of the managed PFDs. |

TABLE 4

Definition of Type AfEventExposureData

| Attribute name | Data type | P | Cardinality | Description |
|---|---|---|---|---|
| afEvents | array(AfEvent) | M | 1 . . . N | AF Event(s) exposed by the NEF after registration of the AF(s) at the NEF. |

TABLE 4-continued

| Definition of Type AfEventExposureData | | | | |
|---|---|---|---|---|
| Attribute name | Data type | P | Cardinality | Description |
| afIds | array(string) | O | 1 . . . N | Associated AF identifications to the AfEvents. The absence of this attribute indicate that the NEF can be selected for any AF. |
| appIds | array(string) | O | 1 . . . N | The list of application ID(s) the AF(s), e.g. the AF device 107, connected to the NEF, e.g. the NEF device 103, supports. The absence of this attribute indicate that the NEF can be selected for any Application. |

External Identifier Definition

External identifiers are used to facilitate communications with packet data networks and one or more applications (e.g. Machine Type Communication (MTC) applications on the external network/MTC servers) as specified in 3GPP TS 23.682 V17.1.0 (2021-09), 3GPP TS 23.501 V17.2.0 (2021-09) and 3GPP TS 23.502 V17.2.1 (2021-09).

An External Identifier identifies a subscription associated to an IMSI. A subscription associated to an IMSI may have one or several External Identifier(s).

The External Identifier shall have the form username@realm as specified in clause 2.1 of IETF RFC 4282.

The username part format of the External Identifier shall contain a Local Identifier as specified in 3GPP TS 23.682 V17.1.0 (2021-09). The realm part format of the External Identifier shall contain a Domain Identifier as specified in 3GPP TS 23.682 V17.1.0 (2021-09). As specified in clause 4 of IETF RFC 4282, the Domain Identifier shall be a duly registered Internet domain name. The combination of Local Identifier and Domain Identifier makes the External Identifier globally unique.

The result of the External Identifier form is:

"<Local Identifier>@<Domain Identifier>"

An example of an External Identifier is:

Local Identifier in use: "123456789";

Domain Identifier="domain.com";

Which gives the External Identifier as:

123456789@domain.com

External Group Identifier

An External Group Identifier identifies a group made up of one or more subscriptions associated to a group of IMSIs.

The External Group Identifier shall have the form groupname@realm as specified in clause 2.1 of IETF RFC 4282.

The groupname part format of the External Group Identifier shall contain a Local Identifier as specified in 3GPP TS 23.682 V17.1.0 (2021-09). The realm part format of the External Group Identifier shall contain a Domain Identifier as specified in 3GPP TS 23.682 V17.1.0 (2021-09). As specified in clause 4 of IETF RFC 4282, the Domain Identifier shall be a duly registered Internet domain name. The combination of Local Identifier and Domain Identifier makes the External Group Identifier globally unique.

The result of the External Group Identifier form is:

"<Local Identifier>@<Domain Identifier>"

An example of an External Group Identifier is:

Local Identifier in use: "Group1";

Domain Identifier="domain.com";

which gives the External Group Identifier as:

Group1@domain.com

As illustrated by the arrow 5, the LI ADMF device 102 stores the one or more NEF profiles. The LI ADMF device stores the information received from the NRF 110 comprised in the Nnrf_NFDiscovery_Response message. More particularly, the LI ADMF device 102 stores the NEF ID of one or more NEF devices 103, the NEF address of one or more NEF devices 103 and status information comprising status of whether one or more AF devices 107 served by the one or more NEF devices 103 are connected or not. The LI ADMF device 102 may further store a list of the AF IDs that are connected. In an embodiment, the LI ADMF device 102 stores one or more AppIDs. In an embodiment, the message comprises a list of AppIds.

Hereby is an advantage that the discovery procedure allows for the LI ADMF device 102 to quickly reach a specific AF device 107, served by the NEF device 103, communicating with an application of a UE, when the LEA 101 requests for the monitoring of the application identified by the appID.

In an embodiment, the discovery procedure involves the NRFs operating in different PLMN. In such a scenario the NRF 110 of the serving PLMN forwards the discovery request message to an NRF 110*a* of the home PLMN which responds with the required discovery information of the one or more NEF devices 103. This is illustrated by arrows 2 and 3 of FIG. 3. In an embodiment, the NRF 110 identifies the NRF 110*a* based on the home PLMN ID.

In general, one or more steps may be performed before the discovery procedure as described above. For example, the CreateDestination described in clause 6.3 of ETSI TS 103 221-1 V1.10.1 (2021-12): Lawful Interception (LI); Internal Network Interfaces; Part 1: X1 and the DeliveryType "X2Only" will be used by the LI ADMF device 102 to add a new Destination to the NRF 110. This procedure may be performed before any of the procedures defined in relation to FIG. 3, FIG. 4 and FIG. 5.

Figure 4:
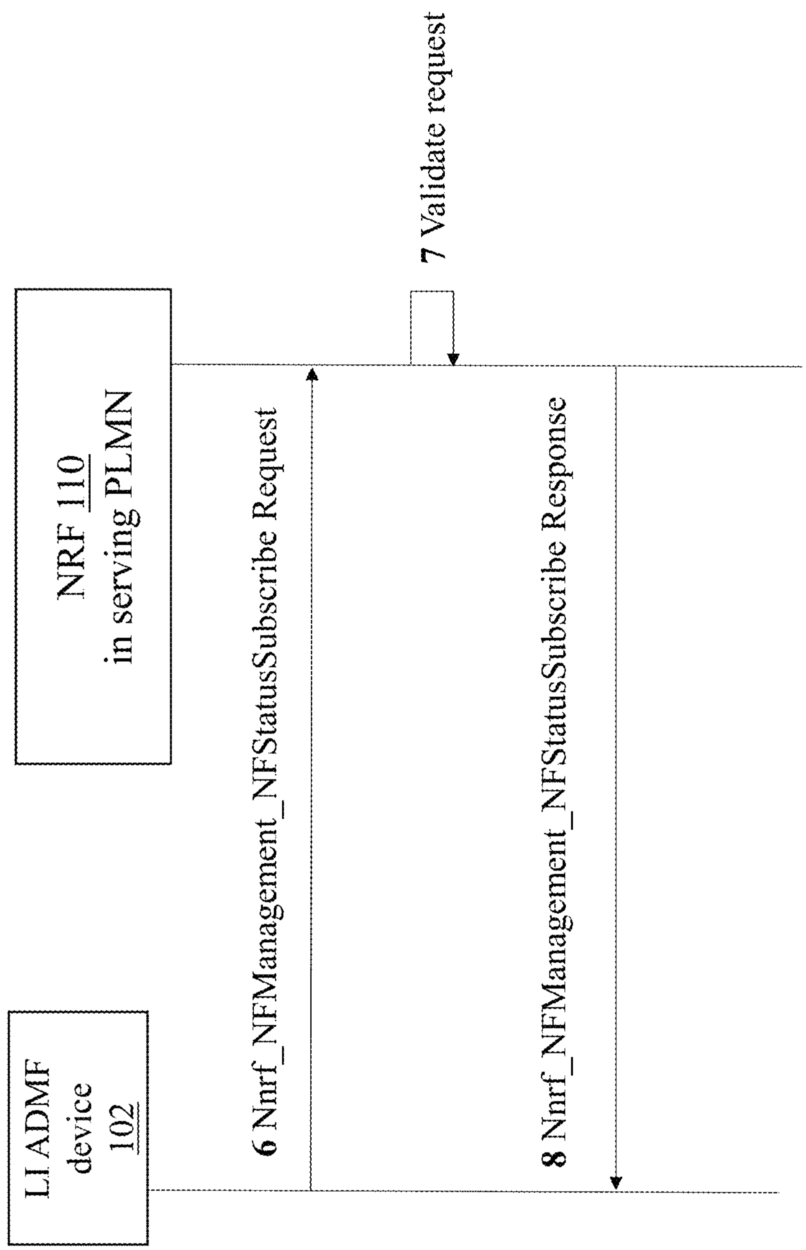
FIG. 4 illustrates a message flow for subscribing to a status update according to an embodiment of the invention.

The LI ADMF device 102 may in some cases, request for subscribing to status update regarding any change in the status of the one or more NEF devices 103. The NEF device 103 may, for example, be the one for which a discovery procedure as described above had been previously performed. As illustrated in FIG. 4 arrow 6, the LI ADMF device 102 sends to the NRF 110, the Nnrf_NFManagement_NFStatusSubscribe Request message. As illustrated by arrow 6, the NRF 110 validates the request for subscription and sends a subscription response message in the form of Nnrf_NFManagement_NFStatusSubscribe Response message of arrow 8.

Figure 5:
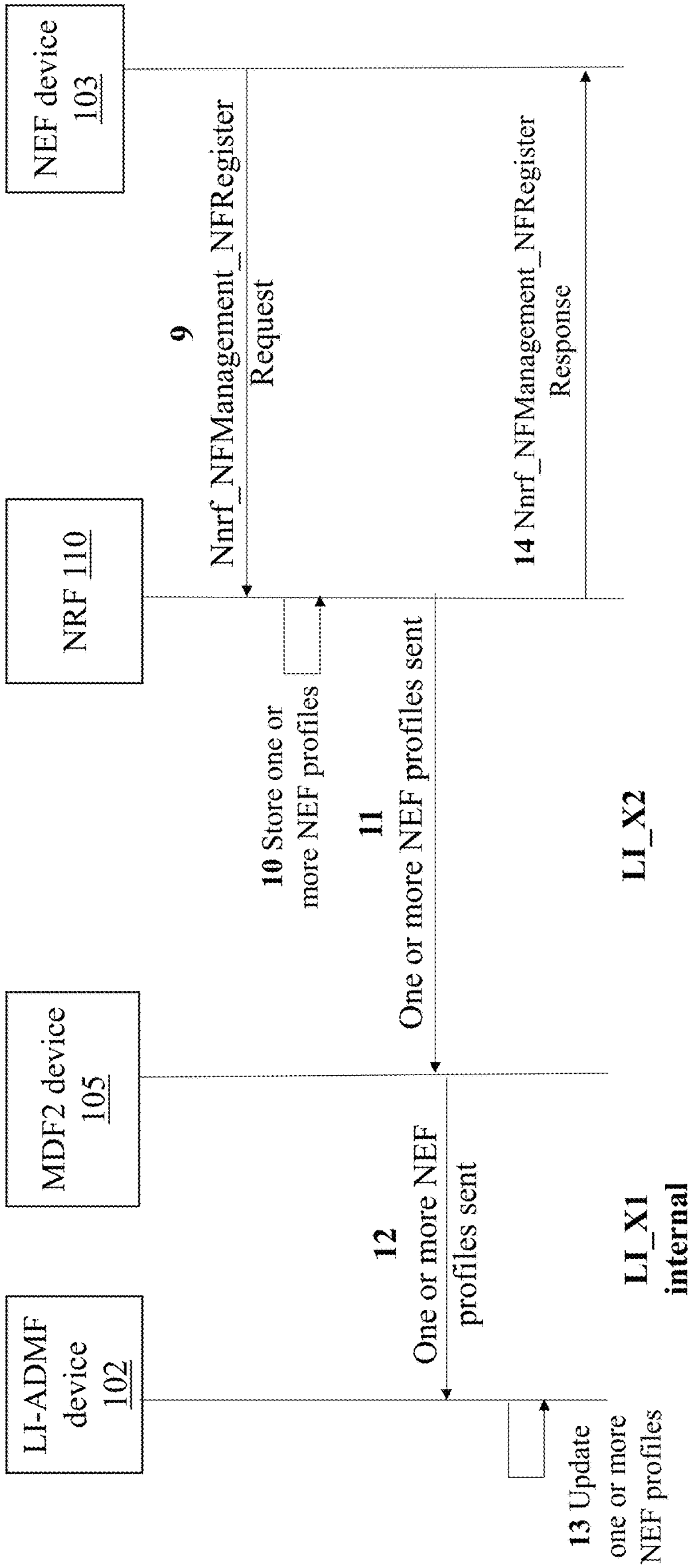
FIG. 5 illustrates a message flow for updating the NEF profile according to an embodiment of the invention.

FIG. 5 illustrates procedure for notifying the status change of the NEF device 103.

As illustrated by arrow 9, the NEF device 103 registers in the NRF, information about the NEF profile by sending to the NRF 110 the Nnrf_NFManagement_NFRegister Request message comprising the NEF profile. The LI-ADMF device 102 may have already subscribed to be informed about the status change of the NEF device 103 according to the procedure of FIG. 4.

As illustrated by arrow 10, the NRF 110 stores the NEF profile. In an embodiment, the NEF profile comprises one or more data described above in relation to Tables 1-4. The NEF profile is sent to the MDF2 device 105 via the LI_X2 interface, according to arrow 11. The MDF2 device 105 then sends the NEF profile to the LI ADMF device 102 via the LI_X1 interface, according to arrow 12. Standard messages are used to send the NEF profile from the NRF 110 to the MDF2 device 105 and from the MDF2 device 105 to the LI ADMF 102. According to arrow 13, the LI ADMF device 102 updates and/or stores the NEF profile in the LI ADMF device 102. As per arrow 14, the NRF then sends the registration response message to the NEF device 103 notifying the registration and updation of the NEF profile. In an embodiment, the registration message is the Nnrf_NFManagement_NFRegister Response message.

Figure 6:
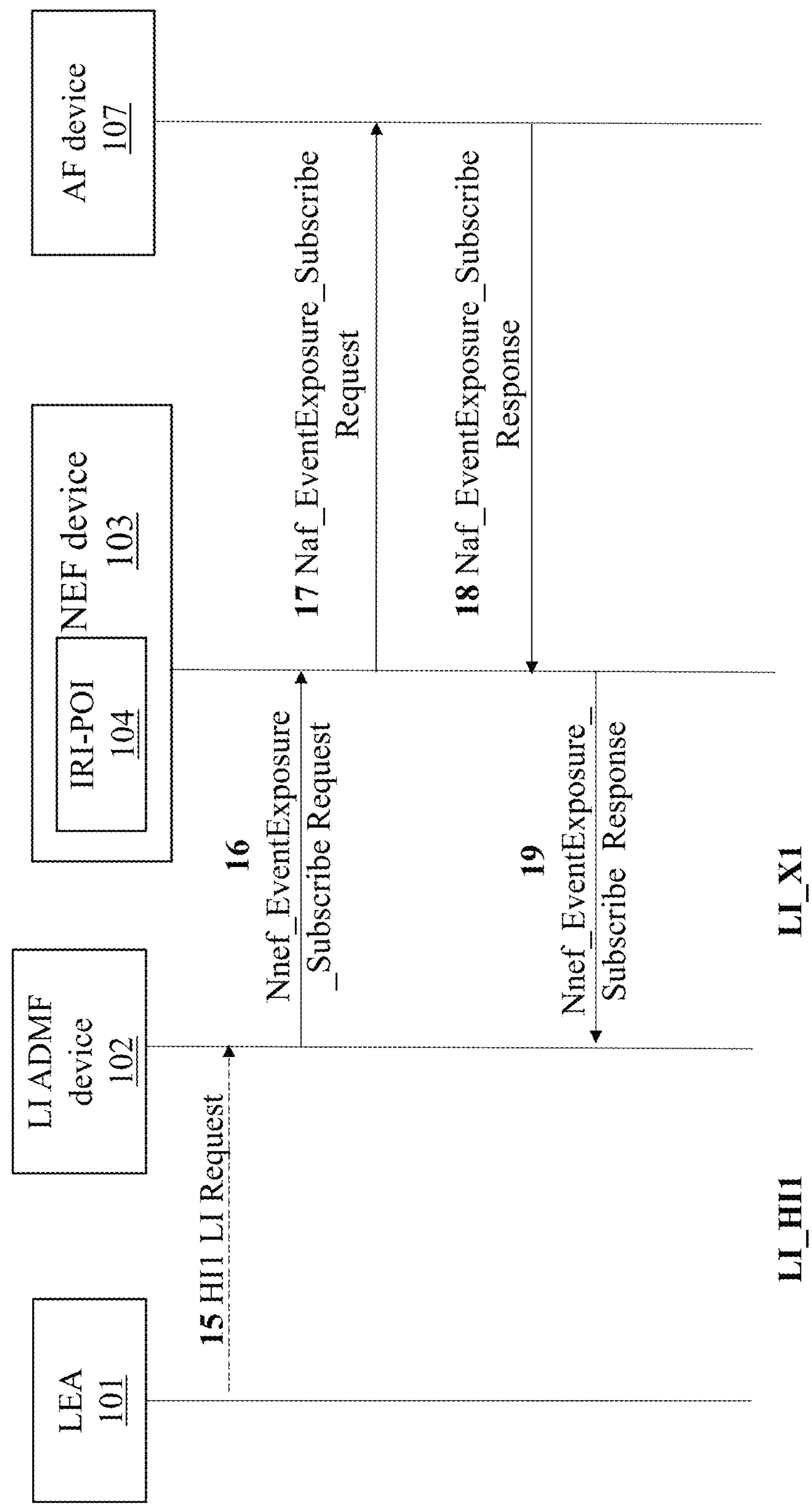
FIG. 6 illustrates the message flow between various entities for subscribing to an event according to one or more embodiments.

As illustrated in FIG. 6, the LEA 101 sends a first request message to the LI ADMF device 102 over the LI_HI interface. In an embodiment, as illustrated by arrow 1 of FIG. 3, the first request message is an HI1 LI Request message or the LIActivation request message. In an embodiment, the first request message comprises the EventFilter information of Table 8 described below later in the application.

The first request message is sent to the LI ADMF device 102 for enabling the LI ADMF device 102 to subscribe to a notification of one or more events. The event may, for example, be a specific event in a 3GPP system which is reported via the AF device 107.

In an embodiment, the event is a monitoring event or an exposure management monitoring event, such as UE Communication, UE Mobility and Service Experience. The UE Communication event is detected in relation to UE application communication information. The UE Mobility event is detected in relation to UE mobility. The Service Experience event is detected in relation to service experience. The one or more monitoring events are detected by the AF device 107.

Table 5 describes one or more monitoring events and their detection criteria.

TABLE 5

List of events and their detection criteria

| Event | Detection criteria | Which NF detects the event |
|---|---|---|
| Loss of Connectivity | Network detects that the UE is no longer reachable for either signalling or user plane communication.<br>The AF may provide a Maximum Detection Time, which indicates the maximum period of time without any communication with the UE after which the AF is to be informed that the UE is considered to be unreachable. | AMF |
| UE reachability | Detected when the UE transitions to CM-CONNECTED state or when the UE will become reachable for paging, e.g., Periodic Registration Update timer. It indicates when the UE becomes reachable for sending downlink data to the UE.<br>The AF may provide the following parameters:<br>1) Maximum Latency;<br>2) Maximum Response Time;<br>3) Suggested number of downlink packets. | AMF, UDM |
| Location Reporting | This event is detected based on the Event Reporting Information Parameters that were received in the Monitoring Request (one-time reporting, maximum number of reports, maximum duration of reporting, periodicity, etc., as specified in clause 4.15.1).<br>It indicates either the Current Location or the Last Known Location of a UE.<br>When AMF is the detecting NF:<br>One-time and Continuous Location Reporting are supported for the Current Location. For Continuous Location Reporting the serving node(s) sends a notification every time it becomes aware of a location change, with the granularity depending on the accepted accuracy of location. For Last Known Location only One-time Reporting is supported.<br>When GMLC is the detecting NF:<br>Immediate and Deferred Location Reporting is supported. For Deferred Location Reporting the event types UE availability, Area, Periodic Location and Motion are supported. | AMF, GMLC |
| Change of SUPI-PEI association | This event is detected when the association between PEI and subscription (SUPI) changes (USIM change). | UDM |
| Roaming status | This event is detected when the UE's current roaming status (the serving PLMN and/or whether the UE is in its HPLMN) and notification when that status changes. | UDM |
| Communication failure | This event is detected when RAN or NAS level failure is detected based on connection release and it identifies RAN/NAS release code. | AMF |

TABLE 5-continued

List of events and their detection criteria

| Event | Detection criteria | Which NF detects the event |
|---|---|---|
| Availability after Downlink Data Notification failure | This event is detected when the UE becomes reachable again after downlink data delivery failure. | AMF |
| PDU Session Status | This event is detected when PDU session is established or released. | SMF |
| Number of UEs present in a geographical area | This event is detected based on the Event Reporting Information Parameters that were received in the Monitoring Request (Level of aggregation, Sampling ratio, see clause 4.15.1).<br>It indicates the number of UEs that are in the geographic area described by the AF. The AF may ask for the UEs that the system knows by its normal operation to be within the area (Last Known Location) or the AF may request the system to also actively look for the UEs within the area (Current Location). | AMF |
| CN Type change | The event is detected when the UE moves between EPC and 5GC. It indicates the current CN type for a UE or a group of UEs when detecting that the UE switches between being served by a MME and an AMF or when accepting the event subscription. | UDM |
| Downlink data delivery status | It indicates the downlink data delivery status in the core network. Events are reported at the first occurrence of packets being buffered, transmitted or discarded, including:<br>Downlink data in extended buffering, including:<br>First data packet buffered event<br>Estimated buffering time, as per clause 4.2.3.3<br>First downlink data transmitted event<br>First downlink data discarded event | SMF |
| UE reachability for SMS delivery | This event is detected when an SMSF is registered for a UE. This enables the UE to receive an SMS.<br>HSS can subscribe to notifications about SMSF registration events in UDM for a given UE as defined in TS 23.632. | UDM: reachability for SMS |
| User State Information in 5GS | Provides user state information in 5GS. | AMF |
| UE Communication | This event is detected in relation to UE application communication information. | AF, e.g. AF device 107 |
| UE Mobility | This event is detected in relation to UE mobility. | AF, e.g. AF device 107 |
| Service Experience | This event is detected in relation to service experience. | AF, e.g. AF device 107 |

In an embodiment, the first request message comprises a technical request to perform an LI. The technical request may still further comprise a technical identifier used to identify a target of a task. The target of a task may, for example, be a UE, a user of a UE, one or more applications running on the UE, an IoT device, or an end-user device. In an embodiment, the technical identifier field is TargetIdentifier.

In an embodiment, the technical request is an LITaskObject. An LITaskObject represents the state of an LI Task i.e. the act of intercepting a communication. In other words, an LITaskObject represents a technical request to perform LI.

In an embodiment, the LITaskObject comprises the TargetIdentifier. The field may comprise information in relation to an event of Table 5. For example, the parameter ApplicationID of the field TargetIdentifier indicates a UE application to be monitored. More specifically, the ApplicationID indicates an application ID of a UE to be monitored.

In an embodiment, the parameter ApplicationID indicates a list of application IDs of a UE to be monitored.

In an embodiment, the target identifier is an application identifier, AppID, identifying an application to be monitored.

In an embodiment, the target identifier is a list of application identifiers, AppIDs, each appID identifying an application to be monitored.

In an embodiment, the target identifier comprises an application identifier, AppID, identifying an application to be monitored.

In an embodiment, the target identifier comprises a list of application identifiers, AppIDs, each appID identifying an application to be monitored.

In an embodiment, the list of AppIDs are used for monitoring applications that pose a threat to the at least a UE and/or at least a user of the UE. In an embodiment, a list of AppIDs are used for monitoring applications that are trusted by the one or more UEs. Hereby is achieved the effect of decreasing the amount of data to report to a collection function running at the LEMF, by selecting/grouping specific applications to be monitored.

Table 6 describes a list of fields comprised in the LITaskObject. It may be noted that, according to Table 6 and Table 8 and an embodiment, the new parameter, ApplicationID for the field TargetIdentifier has been introduced, in addition to at least those described in ETSI TS 103 221-1 V1.10.1 (2021 December). A task, as in Table 6, corresponds to an LITaskObject, which represents a technical request to perform LI.

TABLE 6

| List of fields comprised in the LITaskObject | |
|---|---|
| Field | Description |
| Reference | Lawful Interception Identifier (LIID) assigned to the product of task. |
| Status | The current status of the task as determined by the Receiver. |
| Desired Status | The current status of the task as specified by the Sender. |
| TimeSpan | It indicates the period for which task should occur, as well as provisioning and deprovisioning times. |
| DeliveryType | It indicates whether the interception should contain IRI, Content of Communication (CC) or both. |
| DeliveryDetails | Destination(s) for the intercepted LI traffic. |
| CSPID | Describes the CSP required to implement the Task. |
| HandlingProfile | A dictionary entry which gives the name of a handling profile that represents a set of configuration information associated with this task. |
| InvalidReason | Optional information for the Receiver to indicate why the Object is in the Invalid state. Usage for national agreement. |
| Flags | A set of flags associated with the Task Object. |
| MonitoringType | NUMBER_OF_UES_IN_AN_AREA<br>The LEA 101 sends a request in order to receive a notification of the number of UEs in a given geographic area. |
| TargetIdentifier | ApplicationID<br>Indicates one or more application IDs, of at least a UE, to be monitored. Indicates a list of application IDs, of at least a UE, to be monitored.<br>LocationArea5G<br>It can be either a list of Evolved Universal Terrestrial Radio Access, E-UTRA, cell identifiers, or a list of New Radio, NR, cell identifiers, or a list of Tracking Areas, or a list of civic addresses, or a geographical area, or a combination of any of the above. |
| MonitoringMode | Mode of monitoring - e.g. monitoring up to a maximum number of reports, periodic monitoring along with periodicity (e.g., daily), monitoring up to a maximum duration. |

According to Table 6, an example for the Receiver may be the LI ADMF device 102.

It may be noted that in some embodiments, a parameter comprises an enumeration value. In some other embodiments, the parameter does not comprise an enumeration value and instead, both the parameter and the enumeration refer to the same value comprised in a field, e.g. the TargetIdentifier, of a message.

In the Annex C of the ETSI TS 103 120 V1.10.1 (2021 December) Lawful Interception (LI) Interface for warrant information and Table 5: TargetIdentifier Formats of the ETSI TS 103 221-1 V1.10.1 (2021 December) Lawful Interception (LI) Internal Network Interfaces Part 1: X1, the ApplicationId or AppId is thus introduced. Table 7 illustrates the updated table of the TargetIdentifier format with the AppId type included according to an embodiment of the invention.

Hereby is achieved, by the inclusion of the applicationId in/as the targetIdentifier, capability for an LI authority to monitor a large number of applications running on at least a UE in a 5G network. Further, the inclusion of the list of ApplicationIds will allow the LEA to perform a selection of which applications are to be monitored and which applications are not relevant for monitoring in a certain PLMN.

TABLE 7

| TargetIdentifier Format | | |
|---|---|---|
| Format Name | Description | Format |
| E164Number | E.164 Number in fully international format, written as decimal digits | Given in ETSI TS 103 280 InternationalE164 format |
| IMSI | International Mobile Subscriber Identity, following the Recommendation ITU-T E.212 numbering scheme, written as decimal digits | Given in ETSI TS 103 280 IMSI format |
| IMEI | International Mobile station Equipment Identity, following the numbering plan defined in ETSI TS 123 003, written asdecimal digits without the (Luhn) check digit | Given in ETSI TS 103 280 IMEI format |
| MACAddress | A MAC address | Given in ETSI TS 103 280 MACAddressformat |
| IPv4Address | An IPV4 address | Given in ETSI TS 103 280 IPv4Addressformat |
| IPv6Address | IPv6 address | Given in ETSI TS 103 280 IPV6Address format |
| IPV4CIDR | IPv4CIDR, written in dotted decimal notation followed by CIDR notation | Given in ETSI TS 103 280 IPV4CIDR format |
| IPV6CIDR | IPV6CIDR written as eight groups of four hexadecimal digits separated by a colon, followed by CIDR notation | Given in ETSI TS 103 280 IPV6CIDR format |

TABLE 7-continued

| TargetIdentifier Format | | |
|---|---|---|
| Format Name | Description | Format |
| TCPPort | TCP Port number, written in decimal notation | Given in ETSI TS 103 280 TCPPort format |
| TCPPortRange | Range of TCP Ports, written as decimal numbers separated by a colon | Given in ETSI TS 103 280 TCPPortRange format |
| UDPPort | UDP Port number, written in decimal notation | Given in ETSI TS 103 280 UDPPortformat |
| UDPPortRange | Range of UDP Ports, written as decimal numbers separated by a colon | Given in ETSI TS 103 280 UDPPortRange format |
| EmailAddress | Email address following W3C HTML 5 Recommendation | Given in ETSI TS 103 280 EmailAddressformat |
| SIP-URI | SIP-URI according to the SIP URI scheme given in IETF RFC 3261 | Given in ETSI TS 103 280_SIPURI format |
| TEL-URI | TEL-URI according to the TEL URI scheme (see IETF RFC 3966) Implementers should consider whether the value could be sent as an E.164 number (or one of the related types) instead | Given in ETSI TS 103 280_TELURI format |
| H323-URI | H323 URI according to the H323 URI scheme (see IETF RFC 3508) | Given in H323Uri format (see XSD schema) |
| IMPU | IP Multimedia Public Identity, as per ETSI TS 123 003 | Given in IMPU format (see XSD schema) |
| IMPI | IP Multimedia Private Identity, as per ETSI TS 123 003 | Given in IMPI format (see XSD schema) |
| NAI | Network Access Identifier following IETF RFC 7542 format | Given in ETSI TS 103 280_NAI format |
| RADIUS | Any Radius attribute that uniquely identifies the subscriber within the specific CSP | Given as binary octets containing RADIUS AVP following IETF RFC 2865 clause 5 |
| GTPUTunnelId | GTP-U Tunnel Identifier | Given as a 32-bit integer |
| GTPCTunnelId | GTP-C Tunnel Identifier | Given as a 32-bit integer |
| CallPartyRole | Identifies the role of a party in a call. Intended for use in conjunction with e.g. E164Number | One of the values "Originating", "Terminating", "ForwardedTo" |
| NonLocalIdentifier | Identifies whether the identifier is local or non-local. Intended for use in conjunction with e.g. E164Number | One of the values "Local" or "NonLocal" |
| SUPIIMSI | Subscription Permanent Identifier in IMSI format | Given in ETSI TS 103 280 SUPIIMSI format |
| SUPINAI | Subscription Permanent Identifier in NAI format | Given in ETSI TS 103 280_SUPINAI format |
| SUCI | Subscription Concealed identifier | Given in ETSI TS 103 280_SUCI format |
| PEIIMEI | Permanent Equipment Identifier in IMEI format | Given in ETSI TS 103 280_PEIIMEI format |
| PEIIMEICheckDigit | Permanent Equipment Identifier in IMEICheckDigit format | Given in ETSI TS 103 280 PEIIMEICheckDigit format |
| PEIIMEISV | Permanent Equipment Identifier in IMEISV format | Given in ETSI TS 103 280 PEIIMEISV format |
| GPSIMSISDN | General Purpose Subscription Identifier in MSISDN format | Given in ETSI TS 103 280 GPSIMSISDN format |
| GPSINAI | General Purpose Subscription Identifier in NAI format | Given in ETSI TS 103 280_GPSINAI format |
| TargetIdentifierExtension | Identifier defined by an external specification | See annex B |
| ApplicationId | String providing an application identifier or a list of application identifiers | Given in 3GPP TS 29.571 |

The first request message is sent over the LI_HI1 interface. In an embodiment, the LI_HI1 interface is adapted to send the first request message comprising at least the fields TargetIdentifier, in the LITaskObject. The target identifier comprises the AppID or a list of AppIds.

In an embodiment, the LICF, present in the LI ADMF device 102, receives the first request message (or warrant) from the LEA 101, derives the intercept information from the first request message (or warrant) and provides it to the LIPF. The intercept information may be derived from the fields comprised in the first request message, wherein the field is at least the TargetIdentifier field. The LIPF present in the LI ADMF device 102 provisions, in the NEF device 103 the IRI-POI 104. The IRI-POI 104 may be a Directly Provisioned IRI-POI, i.e. the IRI-POI 104 detect a target's communication that need to be intercepted, and then derives the intercept related information from that target communication. In an embodiment, the IRI-POI 104 may be provisioned as a Triggered IRI-POI, i.e. the IRI-POI 104 detects the target communications based on the trigger received from an associated Triggering Control Function (TCF) and then derives the intercept related information of target communications.

In an embodiment, the LI ADMF device 102 sends to the NEF device 103 via the IRI-POI, the second request message. In other words, the LI ADMF device 102 may first send to the IRI-POI 104, an X1 request message, e.g. ActivateTask request message, comprising the TaskDetails. The TaskDetails may further comprise the TargetIdentifer comprising the AppID or the list of AppIDs according to Table 7. The IRI-POI 104 may then send to the NEF device 103, e.g. to the NEF 103*a* in the NEF device 103, the second request message comprising the EventFilter information. More specifically, the IRI-POI 104 receives the X1 Request message, e.g. ActivateTask request message, comprising one or more fields of, e.g. Table 10, and translates the one or more fields into one or more fields of Nnef_EventExposure_Subscribe request message and sends the Nnef_EventExposure_Subscribe request message to the NEF 103, e.g. to the NEF 103*a* in the NEF device 103. In an embodiment, the IRI-POI 104 translates or maps the TargetIdentifier field comprising AppID comprised in the X1 Request message, e.g. ActivateTask request message, to the TargetIdentifier field comprising the AppID of the Nnef_EventExposure_Subscribe request message. In such a case, the IRI-POI 104 and the NEF device 103, e.g. the NEF 103*a* in the NEF device 103, may exchange messages over an internal interface, e.g. Nnef interface. In other words, the second request message is invoked in the NEF device 103 by the LI ADMF device 102. In an embodiment, the second request message is the Nnef_EventExposure_Subscribe Request message.

It may be noted that while in FIG. 6 arrow 16 a message exchange from the LI ADMF device 102 to the IRI-POI 104 is illustrated to take place over the LI_X1 interface, a further intermediate step, e.g. arrow 16*a*, may be included to internally forward the message from the IRI-POI 104 to the NEF 103*a* in the NEF device 103 via an internal interface Nnef. Similarly, another intermediate step, e.g. arrow 19*a*, may be included to internally forward the subscribe response message from the NEF 103*a* in the NEF device 103 to the IRI-POI via the internal interface Nnef. The IRI-POI then forwards this message to the LI ADMF device 102 over the interface LI_X1 as illustrated by arrow 19.

Translate or map, as mentioned in this application, may refer to a field translated or mapped to another field and/or an enumeration value of one field translated or mapped to an enumeration value of another field and/or a parameter of one field translated or mapped to a parameter of another field and/or a value of one field translated or mapped to a value of another field.

In an embodiment, the first request message and/or the second request message and/or the third request message comprise an EventFilter information comprising the AppID, identifying an application to be monitored. In an embodiment, the first request message and/or the second request message and/or the third request message comprises an EventFilter information comprising a list of AppIDs each identifying an application to be monitored. Table 8 describes one or more data comprised in the EventFilter information.

In an embodiment, the one or more data comprised in the EventFilter information may be applied as input for carrying out the Nnef_EventExposure_Subscribe operation using the Nnef_EventExposure_Subscribe Request message. The one or more data includes at least one of the data according to Table 8 such as a Generic Public Subscription Identifier, GPSI, a Subscriber Permanent Identifier, SUPI, External Group Identifiers, exterGroupIds, Internal Group Identifiers, interGroupIds, any UE (111) Identifier, anyUeInd and Location Area Identifier, locArea.

TABLE 8

| EventFilter Information | | | | | |
|---|---|---|---|---|---|
| Attribute name | Data type | P | Cardinality | Description | Applicability |
| gpsis | array(Gpsi) | O | 1 . . . N | Each element represents external UE identifier. | UeMobility<br>UeCommunication<br>ServiceExperience |
| supis | array(Supi) | O | 1 . . . N | Each element represents a SUPI identifying a UE | UeMobility<br>UeCommunication<br>ServiceExperience |
| exterGroupIds | array(ExtGroupId) | O | 1 . . . N | Each element represents a group of UEs identified by an External Group Identifier. | UeMobility<br>UeCommunication<br>ServiceExperience |
| interGroupIds | array(GroupId) | O | 1 . . . N | Each element represents a group of UEs identified by an Internal Group Identifier | UeMobility<br>UeCommunication<br>ServiceExperience |
| anyUeInd | boolean | O | 0 . . . 1 | Identifies whether the AF request applies to any UE.<br>This attribute shall set to “true” if applicable for any UE, otherwise, set to “false”<br>May only be present and sets to “true” if “Event” sets to “SVC”. | ServiceExperience |
| appIds | array(ApplicationId) | O | 1 . . . N | Each element indicates an application identifier.<br>May be present if “Event” sets to “UE_COMM”, “SVC” or “UE_MOBILITY”<br>If absent, the EventFilter data applies to any application (i.e. all applications) | ServiceExperience<br>UeCommunication<br>UeMobility |
| locArea | LocationArea5G | O | 0 . . . 1 | Represents area of interest.<br>May only be present if “AfEvent” sets to “SVC” or “UE_MOBILITY” | ServiceExperience<br>UeMobility |

In addition to the fields described in Table 8, the second request message or the X Request message or the X1 message may further comprise a message definition, such as, ActivateTask which is used by the LI ADMF device 102 to add a new task to the NEF device 103. The message definition indicates a type of request being made and contains a request parameter (also called field) particular to the type of request. The ActivateTask or ActivateTaskRequest message definition contains a structure as in Table 9.

TABLE 9

ActivateTask message definition structure

| Field | Description |
|---|---|
| TaskDetails | Target and interception details. |

The TaskDetails field comprises fields as described in Table 10. More specifically, the TaskDetails comprises the field TargetIdentifier comprising the parameter ApplicationID, AppID. The AppId indicates one or more application identifiers, of at least a UE, to be monitored. Alternatively, the appID indicates a list of application IDs, of at least a UE, to be monitored. The TaskDetails may, in addition to the fields of Table 10, comprise one or more of the following fields: X1 Identifier (XID), DeliveryType, ListOfDestinationIdentifiers (ListOfDIDs), ListOfMediationDetails, CorrelationID, ImplicitDeactivationAllowed, ProductID and TaskDetailsExtensions. It is to be noted that the fields and their enumeration values (or parameters) relating to the first request message fields i.e. MonitoringType, MonitoringMode and TargetIdentifier, are further included in the TaskDetails field of the second request message.

TABLE 10

Fields comprised in TaskDetails

| Field | Parameter/Description |
|---|---|
| MonitoringType | NUMBER__OF__UES__IN__AN__AREA<br>Applicable for<br>Delivery Type =<br>“X2Only”<br>Either based on ‘last known<br>location’ or ‘current<br>location’. |
| TargetIdentifier | ApplicationID or AppID<br>Indicates one or more application IDs,<br>of at least a UE, to be monitored.<br>Indicates a list of application IDs,<br>of at least a UE, to be monitored.<br>locationArea5G<br>It can be either a list of E-UTRA cell IDs,<br>or a list of NR cell ID, or a list of<br>Tracking Areas, or civic addresses,<br>or a geographic area, or a<br>combination o fany of the above. |
| MonitoringMode | Daily |

As illustrated by arrow 16 of FIG. 6, the LI ADMF device 102 sends a second request message to the NEF device 103, for subscribing to a notification of one or more events for monitoring one or more applications for one or more UEs 111. The notification of the one or more events is provided by the AF device 107. Each application may be identified by an identifier, e.g. AppID. Further, the NEF device 103 is identified based on the discovery information comprised in the LI ADMF device 102.

In an embodiment, the LI ADMF device 102 sends a second request message to the IRI-POI 104 of the NEF device 103. The IRI-POI 104 may be provisioned either in or externally to the NEF device 103.

In an embodiment, the second request message is an Nnef_EventExposure_Subscribe Request message. The second request message or the Nnef_EventExposure_Subscribe Request message may comprise fields, for example, as described in Table 8.

The Nnef_EventExposure_Subscribe request message may, additionally, relate to a Nnef_EventExposure_Subscribe operation. Further the Nnef_EventExposure_Subscribe request message may relate to a 5G NEF service operation of the NEF device 103.

In an embodiment, the Nnef_EventExposure_Subscribe request message comprises at least one of the following monitoring events: Application communication information, UE mobility information, and service information. The application communication information event includes the feature name UE_COMM to indicate if the event is present. The UE mobility information event includes the feature name UE_MOBILITY to indicate if the event is present. The service information includes the feature name SVC to indicate if the event is present.

In an embodiment, the one or more monitoring events are detected based on the Event Reporting Information parameters that are received in the Monitoring Request message, eg. the first request message and/or the second request message.

As illustrated by Arrow 17, the NEF device 103 sends to the AF device 107 a third request message for subscribing to a notification of one or more events for monitoring one or more applications for one or more UEs 111. The notification of the one or more events is provided by the AF device 107. Each application may be identified by an identifier, e.g. AppID. Further, the NEF device 103 is identified based on the discovery information comprised in the LI ADMF device 102. The monitoring events are at least one of the following events: Application communication information, UE mobility information, and service information. The application communication information event includes the feature name UE_COMM to indicate if the event is present. The UE mobility information event includes the feature name UE_MOBILITY to indicate if the event is present. The service information includes the feature name SVC to indicate if the event is present. The third request message may include an event ID identifying each monitoring event.

In an embodiment, the third request message is a Naf_EventExposureSubscribe Request message.

In an embodiment, the NEF device 103 includes a notification endpoint of the NEF device 103 wherein the notification endpoint is one of an IP address or an IP address with a port address.

To subscribe to one or more event notifications, the NF service consumer, e.g. the NEF device 103 may, for example, send an HTTP POST request to the AF device 103 with: “{apiRoot}/naf-eventexposure/{apiVersion}/subscriptions/” as request URI.

The AF device 107 performs function according to 3GPP TS 29.517 V17.3.0 (2021-09). 5G System; Application Function Event Exposure Service; specifies a detailed description of Naf_EventExposure Service, for example, the clause 4.

The AF device 107 is a functional element that provides service or application related information to the NF service consumer. The AF allows NF consumers to subscribe to and unsubscribe from periodic notification and/or notification when subscribed event is detected. The Service operations defined for the Naf_EventExposure Service are shown in Table 11.

TABLE 11

| AF device 107 service operations | | |
|---|---|---|
| Service Operation Name | Description | Initiated by |
| Naf_EventExposure_Subscribe | This service operation is used by an NF service consumer to subscribe to, or modify a subscription in the AF for event notifications on a specified application related event for one or more UE(s) or any UE. | NF Consumer (NWDAF, NEF) e.g. NEF device 103 |
| Naf_EventExposure_Unsubscribe | This service operation is used by an NF service consumer to unsubscribe from event notifications. | NF Consumer (NWDAF, NEF) e.g. NEF device 103 |
| Naf_EventExposure_Notify | This service operation is used by the AF to report application related event(s) to the NF service consumer which has subscribed to the event report service. | AF, e.g. AF device 107 |

An NF, e.g. the NEF device 103, that needs to collect data from the AF device 107 may subscribe/unsubscribe to notifications regarding data collected from the AF device 107, either directly from the AF device 107 or via NEF device 103.

The third request message, Naf_EventExposure_Subscribe Request message, comprises the EventFilter information. The EventFilter information includes one or more data described above according to Table 8. Further, the EventFilter may be included depending on the type of event.

1. If the monitoring event indicated by "SVC_EXPERIENCE" or "SVC" is supported, the EventFilter information provides:
   a. identification of one or more applications, e.g. the AppID, to which the subscription applies.
   b. an area of interest via locationArea5G attribute.
2. If the monitoring event indicated by "UE_COMM" is supported, the EventFilter information provides
   a. identification of one or more applications, e.g. the AppID, to which the subscription applies.
   b. an area of interest via locationArea5G attribute.
3. If the monitoring event indicated by "UE_MOBILITY" is supported, the EventFilter information provides
   a. identification of one or more applications, e.g. the AppID, to which the subscription applies.
   b. an area of interest via locationArea5G attribute.

If the AF device 107 cannot successfully fulfil the received HTTP POST request due to the internal error or an error in the HTTP POST request, the AF device 107 sends the HTTP error response as specified in 3GPP TS 29.517 V17.3.0 (2021-09).

Upon successful reception of the HTTP POST request with "{apiRoot}/naf-eventexposure/{apiVersion}/subscriptions/" as request URI and "AfEventExposureSubsc" data structure as request body, the AF device 107 create a new "Individual Application Event Subscription" resource and may store the subscription request or information comprised therein.

In an embodiment, the AF device 107, authorizes the request for subscription of the one or more events and store an association of an identity of the requester and an event trigger.

In an embodiment, the requester is the NEF device 107 and the identity of the requester is the NEF ID. In an embodiment, the event trigger is at least one of UeCommunication, UeMobility and ServiceExperience.

As illustrated by arrow 18 of FIG. 6, The AF device 107 acknowledges the execution of the Naf_EventExposure_Subscribe operation by sending a Naf_EventExposure_Subscribe Response message to the NEF device 103.

The response may, for example, be a HTTP "201 Created" response as shown in 3GPP TS 29.517 V17.3.0 (2021-09) Clause 5.6. The AF device 107 may include in the "201 Created" response:

a Location header field; and an "AfEventExposureSubsc" data type in the payload body.

The Location header field shall contain the URI of the created individual application session context resource i.e. "{apiRoot}/naf-eventexposure/{apiVersion}/subscriptions/{subscriptionId}". The "AfEventExposureSubsc" data type payload body may contain the representation of the created "Individual Application Event Subscription".

It may be noted that, in general, the AF device 107 is not aware of the monitoring process being performed by the LI nodes. In other words, the AF device 107 sends to the NEF device 103, the requested information about the one or more applications without being aware if the requested information is for monitoring purposes.

Further details regarding the data collected from the AF, e.g. the AF device 107, as well as interactions between the NEF, e.g. the NEF device 103, and the AF, e.g. the AF device 107, are described in 3GPP TS 23.288 V17.2.0 (2021-09) "Architecture enhancements for 5G System (5GS) to support network data analytics services (Release 17)".

As illustrated by arrow 19, the NEF device sends to the LI ADMF a response message confirming the subscription to the notification of the or more events for monitoring one or more applications. The response message is the Nnef_EventExposure_Subscribe Response message.

Figure 7:
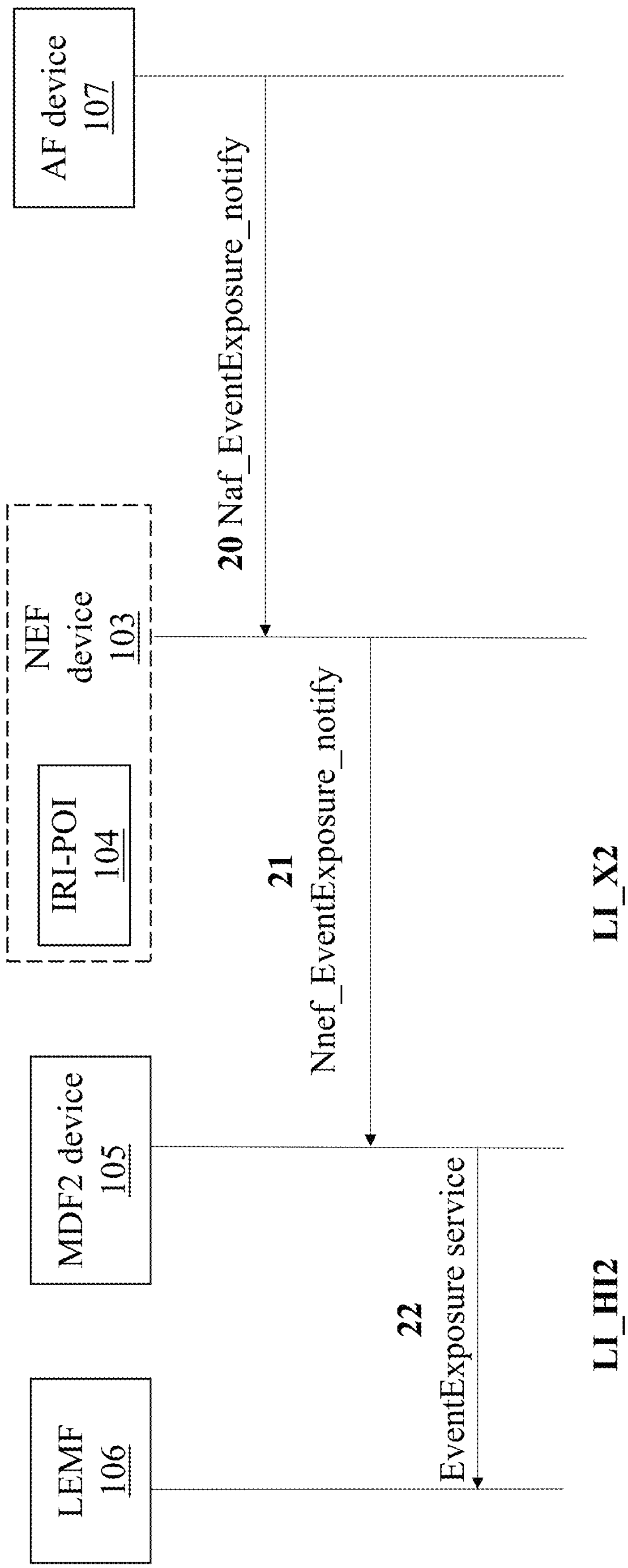
FIG. 7 illustrates the message flow between various entities for notifying about an event according to one or more embodiments.

FIG. 7 illustrates a flow diagram for notification of one or more detected events according to an embodiment of the invention.

The AF device 107 detects the one or more events and sends to the NEF device 103 a first notify message. In an embodiment, the first notify message is a Naf_EventExposure_Notify message. The message may be sent to a notification endpoint of the event receiving NEF device 103. The AF device 107 sends the first notify message for notifying the detection of one or more events subscribed to by the NEF device 103. The monitoring event is for monitoring one or more applications for one or more user equipment, UE, wherein each application is identified by an identifier, such as the AppID.

In an embodiment, the first notify message comprises an event report. The event report will contain one or more of the following data according to Tables 12-20 based on the one or more monitoring events previously described. More specifically, the event report comprises an AppID identifying an application to be monitored by the LI nodes. In an embodiment, the event report comprises a list of AppIDs, each appID identifying an application to be monitored by the LI nodes.

a. UE_COMM

TABLE 12

Event Report for UE_COMM event

| Attribute name | Data type | P | Cardinality | Description |
|---|---|---|---|---|
| timeStamp | DateTime | M | 1 | Time at which the event is observed. |
| supi | Supi | O | 0 . . . 1 | SUPI identifying a UE |
| appId | ApplicationId | M | 1 | Identifies an application identifier. |
| exterGroupId | ExtGroupId | O | 0 . . . 1 | Identifies an external group of UEs. |
| interGroupId | GroupId | O | 0 . . . 1 | Identifies an internal group of UEs. |
| appId | ApplicationId | M | 1 | Identifies an application identifier. |
| comms | array(CommunicationCollection) | M | 1 . . . N | This attribute contains a list of communication information. |

CommunicationCollection will include:

TABLE 13

CommunicationCollection data of UE COMM event

| Attribute name | Data type | P | Cardinality | Description |
|---|---|---|---|---|
| startTime | DateTime | M | 1 | Identifies the timestamp this communication starts. |
| endTime | DateTime | M | 1 | Identifies the timestamp this communication stops. |
| ulVol | Volume | O | 0 . . . 1 | Identifies the uplink traffic volume. |
| dlVol | Volume | O | 0 . . . 1 | Identifies the downlink traffic volume. |

b. UE_MOBILITY

TABLE 14

Event Report for UE_MOBILITY event

| Attribute name | Data type | P | Cardinality | Description |
|---|---|---|---|---|
| timeStamp | DateTime | M | 1 | Time at which the event is observed. |
| supi | Supi | O | 0 . . . 1 | SUPI identifying a UE |
| appId | ApplicationId | M | 1 | Identifies an application identifier. |
| ueTrajs | array(UeTrajectoryCollection) | M | 1 . . . N | Identifies a list of UE moving trajectories. |

Where UeTrajectoryCollection will include:

TABLE 15

UeTrajectory Collection data of UE_MOBILITY event

| Attribute name | Data type | P | Cardinality | Description |
|---|---|---|---|---|
| ts | DateTime | M | 1 | This attribute identifies the timestamp when the UE enters the location. |
| locArea | LocationArea5G | M | 1 | This attribute includes the location information of the UE. |

c. SVC

TABLE 16

Event Report for SVC event

| Attribute name | Data type | P | Cardinality | Description |
|---|---|---|---|---|
| appId | ApplicationId | C | 0 . . . 1 | Indicates an application identifier. Shall be present if the AF event exposure service request applies to more than one application. |
| svcExpPerFlows | array(ServiceExperienceInfoPerFlow) | M | 1 . . . N | Each element represents service experience for each service flow. |
| gpsis | array(Gpsi) | O | 1 . . . N | Each element represents external UE identifier. |
| supis | array(Supi) | O | 1 . . . N | SUPI identifying a UE. |

Where ServiceExperienceInfoPerFlow will include:

TABLE 17

ServiceExperienceInfoPerFlow data of SVC event

| Attribute name | Data type | P | Cardinality | Description |
|---|---|---|---|---|
| svcExprc | SvcExperience | M | 1 | Service experience |
| timeIntev | TimeWindow | M | 1 | Represents a start and stop time of the measurement period for the AF service experience. |

TABLE 17-continued

| ServiceExperienceInfoPerFlow data of SVC event | | | | |
|---|---|---|---|---|
| Attribute name | Data type | P | Cardinality | Description |
| dnai | Dnai | O | 0 . . . 1 | Indicates the DN Access Identifiers representing location of the service flow. |
| ipTrafficFilter | FlowInfo | O | 0 . . . 1 | Identifies IP packet filter |
| ethTrafficFilter | EthFlowDescription | O | 0 . . . 1 | Identifies Ethernet packet filter. |

Where SvcExperience will include:

TABLE 18

| SvcExperience data of SVC event | | | | |
|---|---|---|---|---|
| Attribute name | Data type | P | Cardinality | Description |
| mos | Float | M | 1 | Mean opinion score. |
| upperRange | Float | M | 1 | The upper value within the rating scale range |
| lowerRange | Float | M | 1 | The lower value within the rating scale range |

Table 19 describes one or more data types associated to the data of the target, e.g. the UE or one or more applications of the UE, and the corresponding specification describing them, as can be found in 3GPP TS 29.517 V17.4.0 (2021 December).

TABLE 19

| Data Types references | |
|---|---|
| Data type | Reference |
| ApplicationId | 3GPP TS 29.571 |
| BitRate | 3GPP TS 29.571 |
| DateTime | 3GPP TS 29.571 |
| Dnai | 3GPP TS 29.571 |
| EthFlowDescription | 3GPP TS 29.514 |
| Exception | 3GPP TS 29.520 |
| Float | 3GPP TS 29.571 |
| FlowDescription | 3GPP TS 29.514 |
| FlowInfo | 3GPP TS 29.122 |
| Gpsi | 3GPP TS 29.571 |
| GroupId | 3GPP TS 29.571 |
| IpAddr | 3GPP TS 29.571 |
| LocationArea5G | 3GPP TS 29.122 |
| PacketDelBudget | 3GPP TS 29.571 |
| PacketLossRate | 3GPP TS 29.571 |
| RedirectResponse | 3GPP TS 29.571 |
| ReportingInformation | 3GPP TS 29.523 |
| SupportedFeatures | 3GPP TS 29.571 |
| TimeWindow | 3GPP TS 29.122 |

TABLE 19-continued

| Data Types references | |
|---|---|
| Data type | Reference |
| Uri | 3GPP TS 29.571 |
| Volume | 3GPP TS 29.122 |
| UsageThreshold | 3GPP TS 29.122 |
| Supi | 3GPP TS 29.571 |
| ExtGroupId | 3GPP TS 29.503 |

Table 20 describes a definition of the LocationArea5G Data Type according to an embodiment of the invention.

TABLE 20

| LocationArea5G Data Type | | | |
|---|---|---|---|
| Attribute name | Data type | Cardinality | Description |
| geographicAreas | array(GeographicArea) | 0 . . . N | Identifies a list of geographic area of the user where the UE is located. |
| civicAddresses | array(CivicAddress) | 0 . . . N | Identifies a list of civic addresses of the user where the UE is located. |
| nwAreaInfo | NetworkAreaInfo | 0 . . . 1 | This IE represents the network area information of the user where the UE is located. |

As illustrated by arrow 21 of FIG. 7, the NEF device 103 sends the second notify message to the MDF2 device 105, for notifying the detection of one or more events for monitoring one or more applications for one or more user equipment, UE. Each application is identified by an identifier, e.g. the appID. The second notify message comprises the event report or one or more data of the event report as described above in relation to Tables 12-20.

In an embodiment, the NEF device 103 translates or maps one or more fields comprised in the Event report of the Naf_EventExposure_notify message to one or more fields of Nnef_EventExposure_notify message. More specifically, the appID attribute of the Event Report of the Naf_EventExposure_notify message will be mapped to the ApplicationID or appID attribute of the TargetIdentifier of the Nnef_EventExposure_notify message.

The NEF device 103 or the IRI-POI 104 sends the second notify message over the LI_X2 interface.

In an embodiment, the IRI-POI 104 in the NEF device 103 or the NEF device 103, may send the xIRI message or the second notify message to the MDF2 device 105, as a binary stream of X2 Protocol Data Units (PDUs). Table 21 and Table 22 provide an example X2 PDU format.

TABLE 21

| X2 PDU Header fields | |
|---|---|
| Field | Description |
| Version | The POI (the IRI-POI 104) shall populate the Version field with the version of the specification (e.g. ETSI TS 103 221-2 V1.5.2 |

TABLE 21-continued

| X2 PDU Header fields | |
|---|---|
| Field | Description |
| | (2021-10))) used to create the PDU, given as a 16-bit unsigned integer. Length = 2 octets. |
| PDU Type | X2 PDU. Length = 2 octets. |
| Header Length | The POI (the IRI-POI 104) shall populate the Header Length field with the length of the header in octets, including the mandatory and any conditional fields that have been populated. Length = 4 octets. |
| Payload Length | The POI (the IRI-POI 104) shall populate the Payload Length field with the length of the Payload field in octets. Length = 4 octets. |
| Payload Format | The POI (the IRI-POI 104) shall indicate the format and encoding of the Payload field by setting the Payload Format field to the appropriate value. A list of valid values, and their definitions, is given in clause 5.4 of ETSI TS 103 221-2 V1.4.1 (2021-04). Length = 2 octets. |
| Payload Direction | Indicates the direction of intercepted event contained in the PDU. Length = 2 octets. |
| XID | The POI (the IRI-POI 104) shall populate the XID field with the XID associated with the intercepted product, as assigned by the relevant X1 interface. Length = 16 octets. |
| Correlation ID | The POI (the IRI-POI 104) shall ensure that the PDUs associated with the same communication session are provided the same Correlation ID value. Length = 8 octets. |
| Conditional Attribute fields | Indicates a number of conditional attributes defined by a type-length-value structure. Length = variable. |
| Payload | The POI (the IRI-POI 104) shall populate the payload field with intercepted event or data. Length = variable. |

TABLE 22

| X2 PDU Conditional Attribute fields | |
|---|---|
| Field | Description |
| NFID | Network Function ID as received by the NEF device 103 |
| Timestamp | If used, the POI shall populate the Timestamp field with the time that the content for the PDU was intercepted. |
| Matched Target Identifier | ApplicationID or AppID<br>Indicates one or more application IDs, of at least a UE, to be monitored.<br>Indicates a list of application IDs, of at least a UE, to be monitored.<br>locationArea5G<br>It can be either a list of E-UTRA cell IDs, or a list of NR cell ID, or a list of Tracking Areas, or civic addresses, or a geographic area, or a combination of any of the above. |

The IRI-POI 104 populates the Payload field with the intercepted data or the intercepted event, given in the format specified by the Payload Format field of Table 21. The intercepted event, for example, the UEMobility is included in the payload shall report the event related to UE mobility communication, comprising an application ID, AppID. An example of X2 PDU in xml format is provided below.

```
<PDU>
<Version> current version<Version>
<PDUType>2</PDUType>
<HeaderLenght>variable</HeaderLenght>
<PayloadLength>variable</PayloadLength>
<PayloadFormat>4</PayloadFormat>
<PayloadDirection>1<PayloadDirection>
<XID>123e4567-e89b-12d3-a477-
426614174000</XID>
<CorrelationId><CorrelationId>
<ConditionalAttribute>
```

-continued

```
<NFID></NFID>
<Timestamp>2020-09-
10T13:37:00.012345+02:00</Timestamp>
<Matched Target Identifier> carnaby street
450</Matched Target Identifier>
</Conditional Attribute>
<Payload>
<EventContent>
<Event> UEMobility
</Event>
<AppID>xxxxx</AppID>
</EventContent>
</Payload>
</PDU>
```

When an event notification message is received by the MDF2 device 105 from the NEF device 103 or the IRI-POI 104, in case of DeliveyType comprising X2Only, and TargetIdentifier comprising the AppID, the MDF2 device 105 will provide at least an identifier of the one or more applications to be monitored.

Hereby is an advantage that the LEMF 106 could use the above data, eg. AppID or a list of AppIDs, for monitoring purposes. The monitoring purpose may, for example, be for public safety or for monitoring one or more applications that are threat to a UE or a user of a UE.

As illustrated by arrow 22 of FIG. 7, the MDF2 device 105 converts the intercepted traffic (or intercepted event) into a standard format of a EventExposure message (or an event notification message). The MDF2 device 105 sends the EventExposure message comprising at least the targetIdentifier comprising the appID via the LI_HI2 interface, to a collection function running at the LEMF 106. The standard format of the EventExposure message (or an event notification message) message sent over LI_HI2 is structured as a header and a payload. The header contains general information like LIID, timestamp, correlation information. The payload contains intercepted information (or intercepted event) that the MDF2 device 105 has earlier received, such as those received from the IRI-POI 104. Messages defined as passing over the LI_HI2 interface, may for example, be passed as the payload of the three GPP33128DefinedIRI field. The LEMF 106 provides collection, storage and analysis of the intercepted traffic (or intercepted event).

Figure 8:
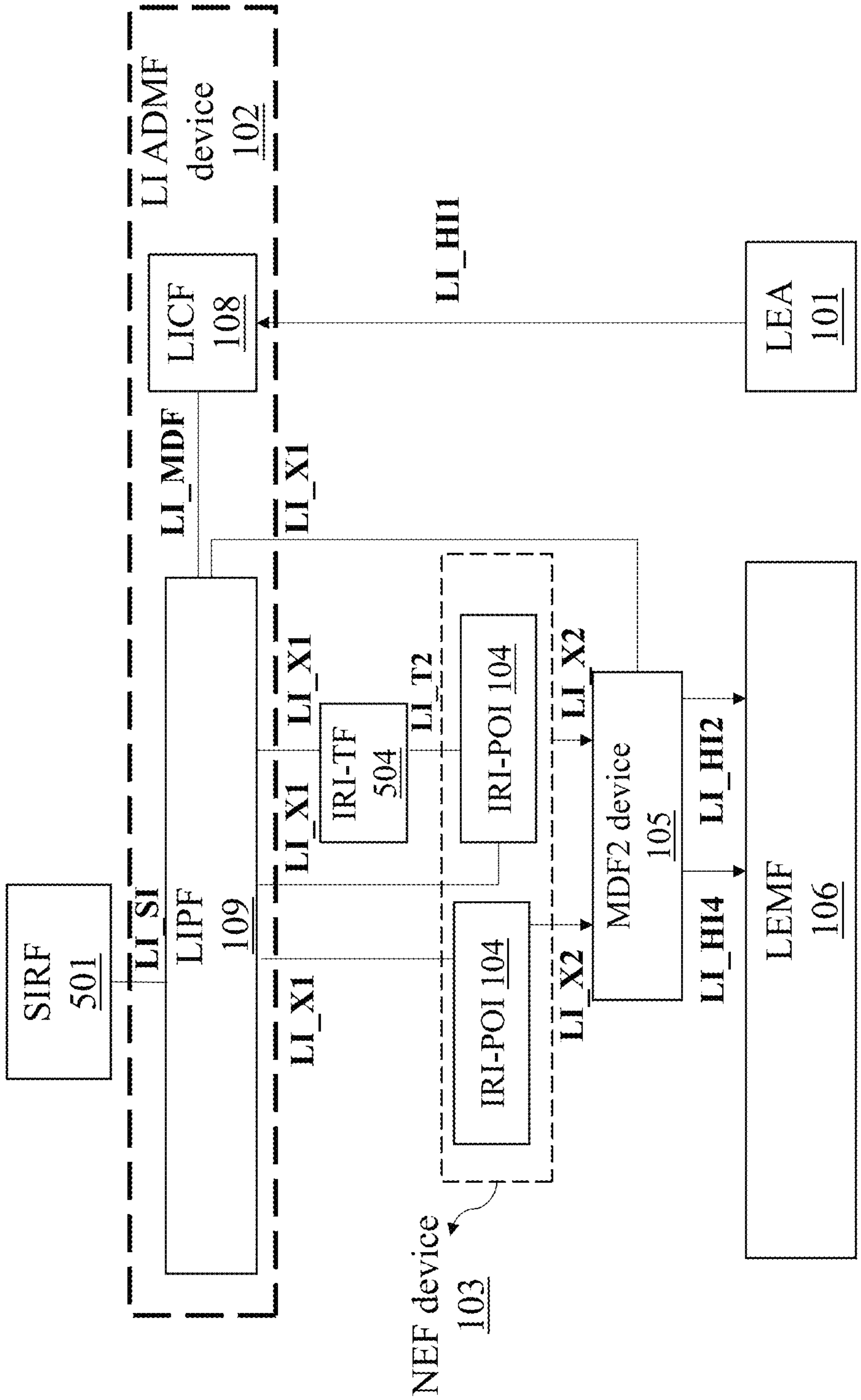
FIG. 8 illustrates a schematic diagram of components of an LI system used in a 5G network.

FIG. 8 illustrates in some more detail LI functionality that may be involved in handling LI information for LI and/or non-LI purposes in a 5G scenario as described herein.

Law Enforcement Agency (LEA) 101:

In general, the LEA 101 is responsible for submitting a warrant for lawful interception to a communications service provider (CSP) whose network is the home network of a subscriber associated with the targeted communicating entity, although in some countries the warrant may be provided by a different legal entity (e.g. judiciary).

Point of Interception (POI) 104:

The IRI-POI 104 detects the target communication, derives the intercept related information (IRI) from the target communications and delivers the POI output as xIRI to the MDF2 device 105. The output of a POI is determined by the type of the network function (cf. above) associated with the IRI-POI 104. As discussed above, the IRI-POI 104 may be embedded within a network function (NF), for example the NEF device 103 or separate from a NF with which it is associated. Multiple POIs may have to be involved in executing a warrant.

Triggering Function (TF) 504:

An IRI-TF 504 is provisioned by an LI provisioning function (LIPF) 109 (which will be described in further detail below) and is responsible for triggering the respective IRI-POI 104, in response to network and service events matching the criteria provisioned by the LIPF 109. The IRI-TF 504 detect the target communications and sends a trigger to the associated triggered IRI-POI 104.

As a part of this triggering, the IRI-TF 504 sends all necessary interception rules (i.e. rules that allow the IRI-POI 104 to detect the target communications), forwarding rules (i.e. addresses of the MDF2 device 105, target communicating entity 101, and the correlation information.

A TF may interact with other POIs to obtain correlation information.

Mediation and Delivery Function2 (MDF2) Device 105:

The MDF2 device 105 delivers the Interception Product to the LEMF 106. The MDF2 device 105 generates the IRI messages from the xIRI and sends them to one or more LEMFs, e.g. the LEMF 106. The MDF2 device 105 is provisioned by the LIPF 109 with the intercept information necessary to deliver the IRI to one or more LEMFs, e.g. the LEMF 106.

Lawful Interception Administrative function (LI ADMF) device 102:

The LI ADMF device 102, which is responsible for the overall management of the LI functionality, includes the two logical functions: a LICF 108 and a LIPF 109. Within the LI ADMF device 102 there is one LICF 108, and at least one, but possibly multiple LIPFs 109. Although not illustrated in FIG. 5, the LI ADMF device 102 also contains the issuing certificate authority (CA) for all LI components (POIs, MDFs etc.).

The LICF 108 controls the management of the end-to-end life cycle of a warrant. The LICF 108 contains a master record of all sensitive information and LI configuration data. The LICF 108 is ultimately responsible for all decisions within the overall LI system. The LICF 108, via the LIPF 109 acting as its proxy, is responsible for auditing other LI components (POIs, MDFs etc.). The LICF 108 is responsible for communication with the LEA 101.

The LICF 108 provides intercept information derived from the warrant for provisioning at the IRI-POI 104, IRI-TF 504, and the MDF2 device 105. Except for the communication with the LEA 101, all other communication between the LICF 108 and any other entities is proxied by the LIPF 109.

The LICF 108 also maintains and authorizes a master list of POIs, TFs and MDFs. In dynamic networks the LIPF 109 is responsible for providing the LICF 108 with any necessary updates to such a POI/TF and MDF master list.

The LIPF 109 provisions all the applicable POIs, TFs and MDFs, e.g. the IRI-POI 104, the IRI-TF 504, and the MDF2 device 105. The role of the LIPF 109 varies depending on implementation of network functions and of the LI ADMF device 102 itself (e.g. virtual or non-virtual). In its simplest form, the LIPF 109 is the secure proxy used by the LICF 108 to communicate with POIs, TFs, MDFs, e.g. the IRI-POI 104, the IRI-TF 504, the MDF2 device 105 or other infrastructure required to operate LI within the telecommunication network 100. In this scenario the LIPF 109 does not store target information and simply routes LI_X1 messages from and to the LICF 108.

In scenarios where the LI ADMF device 102 is required to take an active role in POI triggering, the LIPF 109 is responsible for receiving triggering information (e.g. from an IRI-TF) and forwarding the trigger to the appropriate POI.

For directly provisioned POIs, TFs and MDFs, e.g. the IRI-POI 104, the IRI-TF 504, and the MDF2 device 105, the LIPF 109 will forward all LI administration instructions from the LICF 108 to the intended destination POI, TF or MDF, e.g. the IRI-POI 104, the IRI-TF 504, and the MDF2 device 105.

In an SBA, the LIPF 109 may be responsible for identifying changes to NFs, POIs, and TFs and MDFs through interaction with the SIRF 501 or underlying virtualization infrastructure. The LIPF 109 shall notify the LICF 108 of changes affecting the number of active NFs/POIs and TFs or other information which the LICF 108 requires to maintain the master POI/TF and MDF list.

While the LIPF 109 is assumed to be stateful with respect to dynamic interceptions it is managing, it shall not hold the full static target or other historic LI data. If the LIPF 109 is deployed in a virtualized environment, the LIPF 109 shall not store LI information in persistent storage and shall rely on the LICF 108 to manage re-synchronization in the case of LIPF 109 restart.

System information retrieval function (SIRF) 501:

The SIRF 501 is responsible for providing the LIPF 109 with the system related information for NFs that are known by the SIRF 501 (e.g. service topology). The information provided shall allow the LIPF 109 and LICF 108 to perform the necessary operations to establish and maintain interception of the target service (e.g. provisioning POIs, TFs and MDFs, e.g. the IRI-POI 104, the IRI-TF 504, and the MDF2 device 105 over the LI_X1 interface as will be discussed below). LIPF/LICF 109, 108 knowledge of the existence of POI, TF and MDF, e.g. the IRI-POI 104, the IRI-TF 504, and the MDF2 device 105, is provided directly by interactions between the LIPF/LICF 109, 108 and the underlying telecommunication network provider's management systems that instantiate NFs.

While the LIPF 109 is responsible for interactions with the SIRF 501, the LIPF 109 will forward applicable information to the LICF 108.

Law Enforcement Monitoring Facility (LEMF) 106:

The LEMF 106 receives the interception product (i.e. information pertaining to performed LI) from the MDF2 device 105. However, a detailed description of the LEMF 106 is outside of scope of the present disclosure.

Interface LI_SI

Lawful interception system information interface (LI_SI) is an interface between the SIRF 501 and the LIPF 109. The SIRF 501 uses this interface to provide the system information to the LIPF 109. The LIPF 109 may request the SIRF 501 for such information before sending the intercept provisioning information to the IRI-POI 104. The SIRF 501 may also notify the LIPF 109 whenever the status of a system function changes (e.g. removed from service, migrating to another location, etc.).

Interface LI_HI1

Lawful interception handover interface (LI HIT) is used to send warrants and other interception request information from the LEA 101 to the CSP that provides the telecommunication network 100. This interface may be electronic or may be an offline manual process depending on national warranty processes.

The LI_HI1 interface is modified or adapted to carry one or more information as described below:

- TargetIdentifier: comprises the ApplicationID or AppID. indicates one or more application IDs, of at least a UE, to be monitored. Alternatively, indicates a list of application IDs, of at least a UE, to be monitored. It may also comprise LocationArea5G.
- MonitoringType: used by the LEA 101 to request to be notified events, for example, UeMobility, UeCommunication, ServiceExperience, NUMBER_OF_UES_IN_AN_AREA.
- MonitoringMode—used to indicate monitoring up to a maximum number of reports, periodic monitoring along with periodicity (e.g., daily), monitoring up to a maximum duration
- RequestedData comprising a parameter (or enumerated value) NIDD indicating subscribing to one or more NIDD events
- Type of intercept: Used to indicate whether IRI only, CC only, or both IRI and CC, is to be delivered to the LEMF 106. In some embodiments according to the present invention, IRI only is used.
- Service scope: Used to identify the service (e.g. voice, packet data, messaging, target positioning) to be intercepted.
- Filtering criteria: Used to provide additional specificity for the interception (e.g. for bandwidth optimization).
- LEMF address: Used to deliver the interception product.
- Lawful interception identifier: Used to associate the interception product with the issued warrant.

Interface LI_X1 (Lawful Interception Internal Interface 1)

LI_X1 interfaces are used to manage the POIs, e.g. the IRI-POI 104, and triggering functions, e.g. IRI-TF 504, and to provision LI target information on the POIs and TFs to intercept target communications. LI_X1 interfaces are also used to manage and provision mediation and delivery functions, e.g. the MDF2 device 105, with the necessary information to deliver those communications in the correct standard format to LEMFs, e.g. LEMF 106.

LI_X1 Between LIPF and POI

The following are examples of some of the information that may be passed over LI_X1 from the LIPF 109 to the POI, e.g. the IRI-POI 104, as a part of intercept provisioning at the NEF device 103. In other words, the LI_X1 interface is modified or adapted to carry one or more information as described below:

- Information necessary to associate multiple xIRI at the MDF2 device, e.g. the MDF2 device 105
- Information necessary to provision the IRI-POI at the NEF device, e.g. the NEF device 103
- TargetIdentifier (Eg: locationArea5G, appID)
- MonitoringType (Eg: for example, UeMobility, UeCommunication, ServiceExperience, NUMBER_OF_UES_IN_AN_AREA)
- MonitoringMode (Eg: daily)
- Type of intercept (IRI only).
- Service scoping
- Further filtering criteria
- Address of the MDF2 device 105
- Address of the NEF device 103 The exact nature of the information passed depends on the role of the POI.

In an embodiment, the LI_X1 interface between the LIPF 109 (in the LI ADMF device 102) and a triggered POI, e.g. the IRI-POI 104, shall be used only for audit and management purposes, and not for provisioning purposes.

LI_X1 Between LIPF and TF

The following are examples of some of the information that may be passed over LI_X1 from the LIPF 109 to the TF, e.g. IRI-TF 504, as a part of intercept provisioning. In other words, the LI_X1 interface is modified or adapted to carry one or more information as described below:

- Information necessary to associate multiple xIRI at the MDF2 device, e.g. the MDF2 device 105.
- TargetIdentifier (Eg: locationArea5G, appID)
- MonitoringType (Eg: for example, UeMobility, UeCommunication, ServiceExperience, NUMBER_OF_UES_IN_AN_AREA)
- MonitoringMode (Eg: daily)
- Type of Intercept (IRI only)
- Service Scoping
- Further filtering criteria
- Address of the MDF2 device 105
- The exact nature of the information passed depends on the role of the TF.

LI_X1 Between LIPF and MDF2 Device

The following are examples of some of the information that may be passed over LI_X1 from the LIPF 109 to the MDF2 device 105, as a part of intercept provisioning:

- Information necessary used to associate multiple xIRI at the MDF2 device 105
- Target Identifier
- Lawful Interception Identifier
- Type of Intercept (IRI only)
- Service Scoping
- Further filtering criteria
- Address of LEMF 106
- The exact nature of the information passed depends on the role of the MDF.

Interface LI_X2 (Lawful Interception Internal Interface 2)

The LI_X2 interfaces are used to pass xIRI from IRI-POIs, e.g POI 104, to the MDF2 device 105.

The following are some of the information passed over the LI_X2 interface to the MDF2 device 105 as a part of xIRI. In other words, the LI_X2 interface is modified or adapted to carry one or more information as described below:

- Target Identifier or Matched Target Identifier (For e.g.: locationArea5G, appID)
- Time stamp Intercept Related Information (IRI) event resulting in xIRI.

It is to be noted however that fully standardised definition of LI_X2 interface is outside the scope of the present disclosure.

Interface LI_T

The LI_T interface is used to pass the triggering information from the triggering function, e.g. IRI-TF 504 to the POI, e.g. the IRI-POI 104. Depending on the POI type, two types of LI_T are defined: LI_T2 and LI_T3. LI_T2 is used when POI Output is sent over LI_X2.

Interface LI_T2

The LI_T2 interface is from the IRI-TF 504 to the IRI-POI 104. The following are some of the information passed over this interface to the IRI-POI 104:

Target Identifier

IRI interception rules

MDF2 device address

Correlation Information.

The IRI interception rules allow the IRI-POI 104 to detect the target communication information to be intercepted.

Interface LI_HI2 (LI_Handover Interface 2)

LI_HI2 is used to send IRI from the MDF2 device 105 to the LEMF 106. This interface is defined in 3GPP TS 33.128 V17.2.0 (2021-09) Release 17.

LI Operation Notification

The MDF2 device 105 shall support reporting to the LEMF 106 changes to provisioning, including:

Activation of LI

Modification of active LI

Deactivation of LI

It is to be noted that the mechanism may be needed at the CSP to prevent duplicate notifications being raised in the case of LI being provisioned across multiple MDFs.

Contents of the Notification

Each notification shall include at least the following:

The type of notification (e.g. activation, deactivation)

Relevant related information (LIID, time of change)

Interface LI_ADMF

LI_ADMF is an interface between LICF 108 and LIPF 109 and is used by the LICF 108 to send the intercept provisioning information to the LIPF 109.

Figure 9:
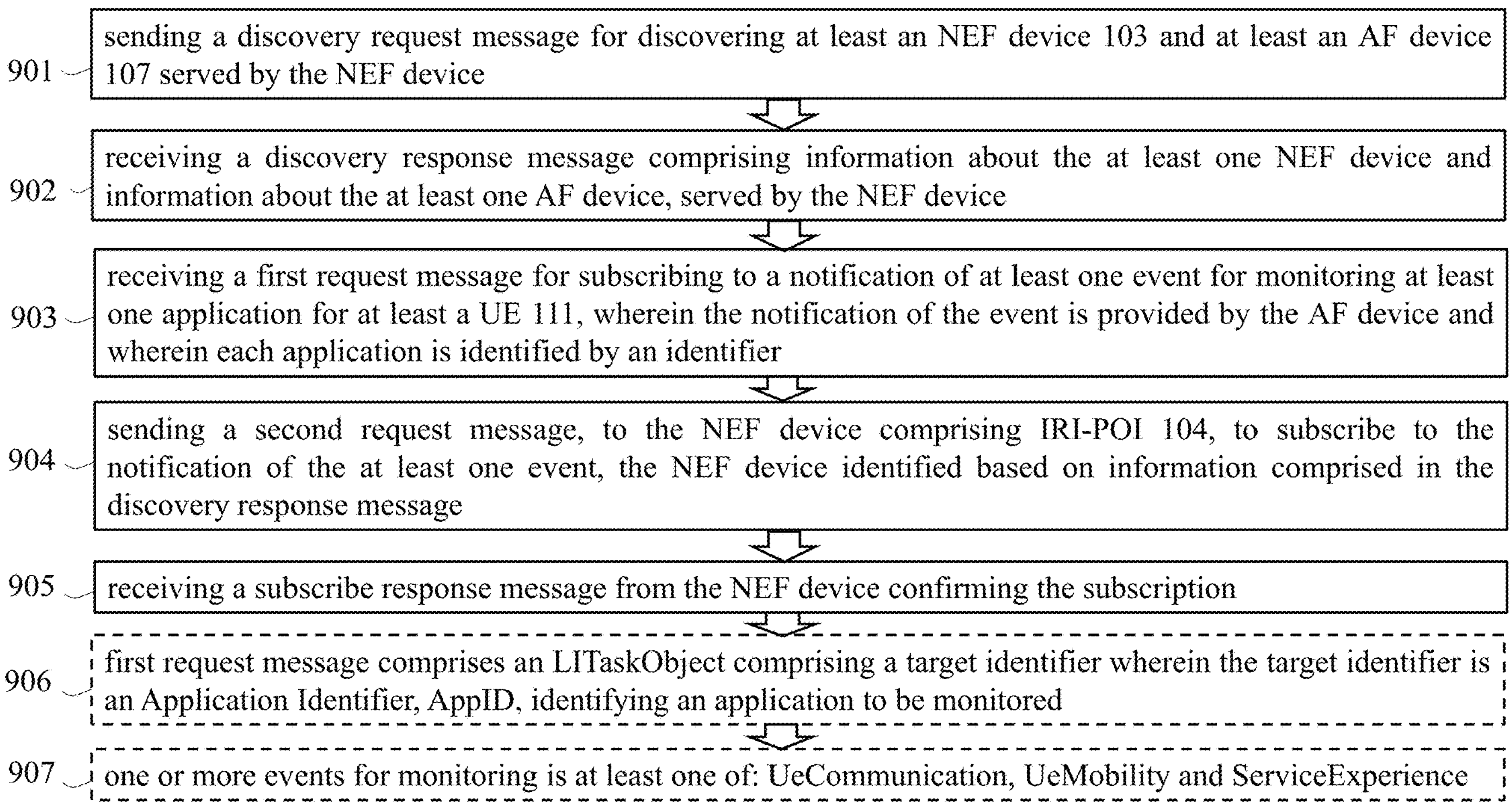
FIG. 9 illustrates a flow chart of a method performed by the LI ADMF device according to one or more embodiments.

FIG. 9 is a flowchart illustrating an embodiment of a method performed by the LI ADMF device 102. Referring to FIG. 9, the method comprises:

sending 901 to a Network Repository Function, NRF, 110 a discovery request message for discovering one or more NEF instances and one or more Application Function, AF, devices 107 served by the one or more NEF devices 103;

receiving 902 from the NRF, a discovery response message comprising information about the one or more NEF devices 103 and information about the one or more AF devices, served by the one or more NEF devices 103.

receiving 903 from a Law Enforcement Agency, LEA, 101 a first request message for subscribing to a notification of one or more events for monitoring one or more applications for one or more user equipment, UE, 111 wherein the notification of the one or more events is provided by the AF and wherein each application is identified by an identifier; and sending 904 a second request message, to the NEF device 103 comprising an Intercept Related Information Point of Interception, IRI-POI, 104 to subscribe to the notification of the one or more events, wherein the NEF device 103 is identified based on the information comprised in the discovery response message;

receiving 905 a subscribe response message from the NEF device 103 confirming the subscription to the notification of the one or more events.

In an embodiment depicted by 906, the first request message comprises an LITaskObject comprising a target identifier wherein the target identifier is the AppID, identifying an application to be monitored.

In an embodiment depicted by 907, the one or more events for monitoring is at least one of: UeCommunication, UeMobility and ServiceExperience.

Figure 10:
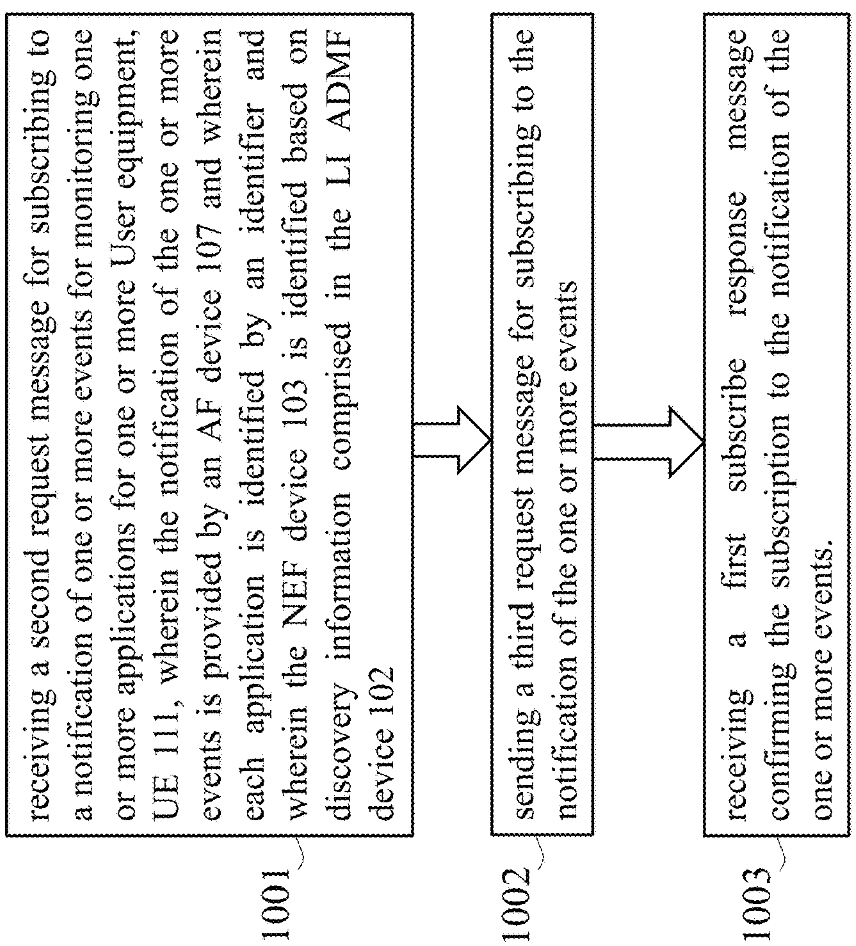
FIG. 10 illustrates a flow chart of a method performed by the NEF device according to one or more embodiments.

FIG. 10 is a flowchart illustrating an embodiment of a method performed by the NEF device 103. Referring to FIG. 10, the method comprises:

receiving 1001 from a Lawful Interception Administration Function, LI ADMF, device, 102 a second request message for subscribing to a notification of one or more events for monitoring one or more applications for one or more user equipment, UE, 111 wherein the notification of the one or more events is provided by an Application Function and wherein each application is identified by an identifier and wherein the NEF device 103 is identified based on discovery information comprised in the LI ADMF device 102;

sending 1002 a third request message, to an Application Function, AF, device 107 for subscribing to the notification of the one or more events; and receiving 1003 from the AF device 107, a first subscribe response message confirming the subscription to the notification of the one or more events.

Figure 11:
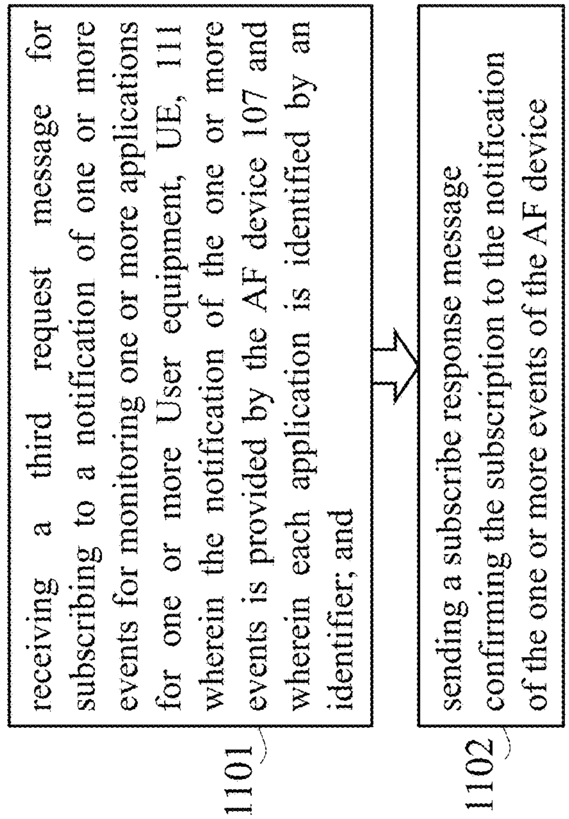
FIG. 11 illustrates a flow chart of a method performed by the AF device according to one or more embodiments.

FIG. 11 is a flowchart illustrating an embodiment of a method performed by the AF device 107. Referring to FIG. 11, the method comprises:

receiving 1101 from a Network Exposure Function, NEF, device 103 comprising an Intercept Related Information Point of Interception, IRI-POI, 104 a third request message for subscribing to a notification of one or more events for monitoring one or more applications for one or more user equipment, UE, wherein the notification of the one or more events is provided by the AF device 107 and wherein each application is identified by an identifier; and sending 1102 to the NEF device 103, a subscribe response message confirming the subscription to the notification of the one or more events of the AF device 107.

Figure 12:
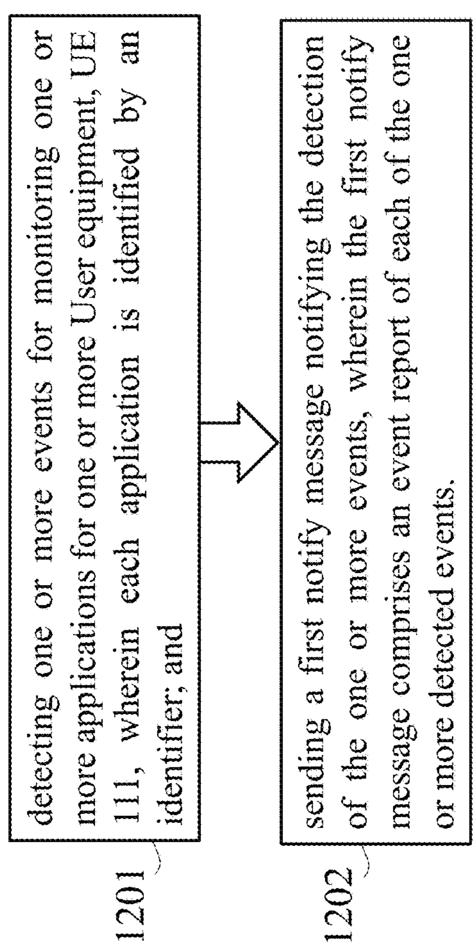
FIG. 12 illustrates a flow chart of a method performed by the AF device according to one or more embodiments.

FIG. 12 is a flowchart illustrating an embodiment of a method performed by the AF device 107. Referring to FIG. 12, the method comprises:

detecting 1201 one or more events for monitoring one or more applications for one or more user equipment, UE, 111 wherein each application is identified by an identifier; and sending 1202 to a Network Exposure Function, NEF, device 103 a first notify message notifying the detection of the one or more events, wherein the first notify message comprises an event report of each of the one or more detected events.

Figure 13:
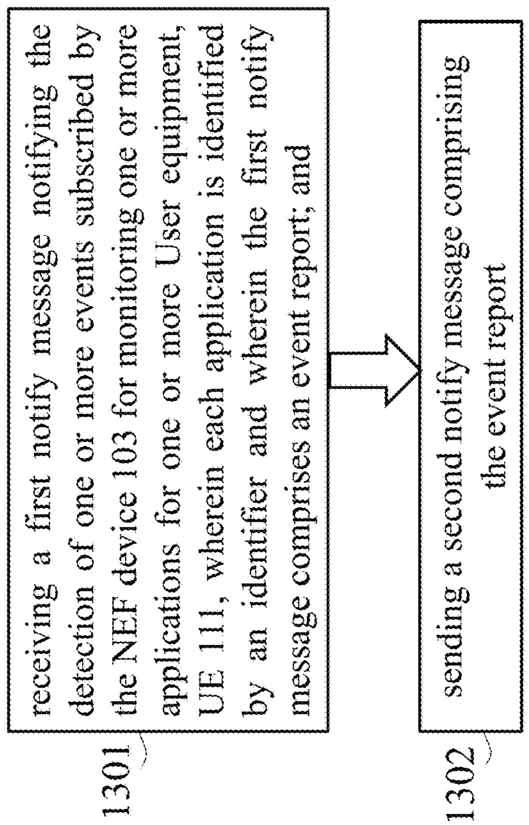
FIG. 13 illustrates a flow chart of a method performed by the LI ADMF device according to one or more embodiments.

FIG. 13 is a flowchart illustrating an embodiment of a method performed by the NEF device 103. Referring to FIG. 13 the method comprises:

receiving 1301 from an Application Function, AF, device 107 a first notify message notifying the detection of one or more events subscribed by the NEF for monitoring one or more applications for one or more user equipment, UE, wherein each application is identified by an identifier and wherein the first notify message comprises an event report; and sending 1302 to a Mediation and Delivery Function 2, device 105 a second notify message comprising the event report.

Figure 14:
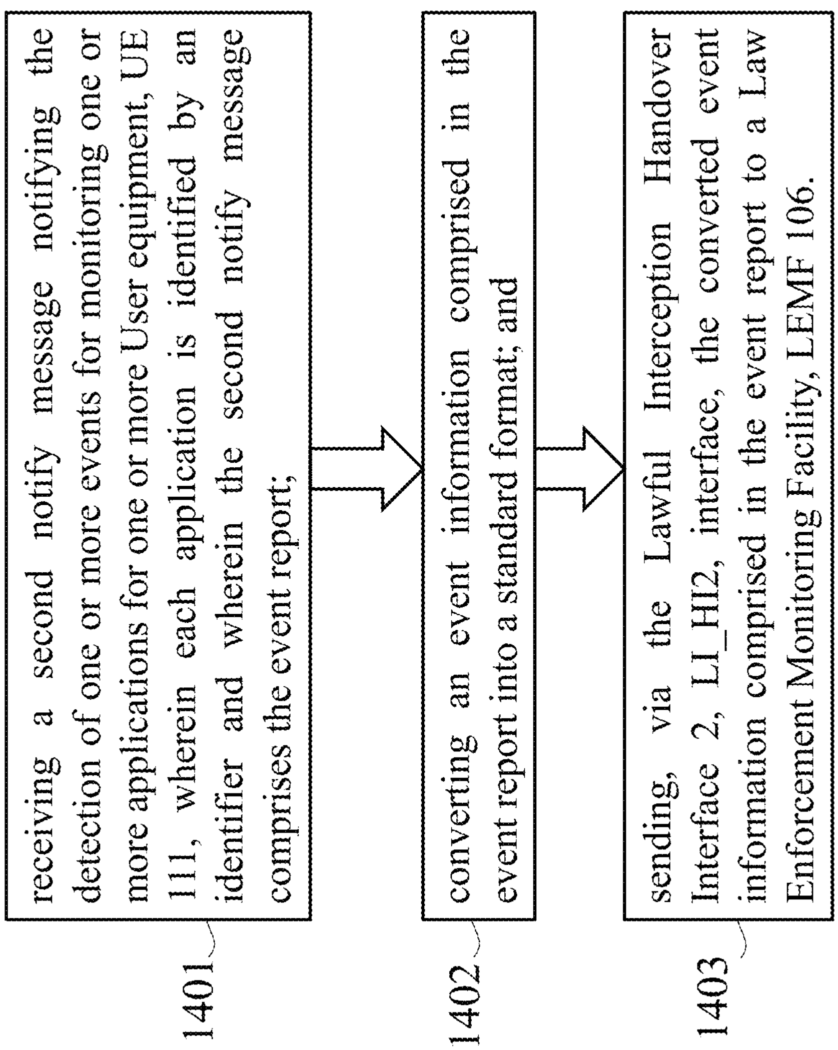
FIG. 14 illustrates a flow chart of a method performed by the MDF2 device according to one or more embodiments.

FIG. 14 is a flowchart illustrating an embodiment of a method performed by the MDF2 device 105. Referring to FIG. 14, the method comprises:

receiving 1401 from a Network Exposure Function, NEF, device a second notify message notifying the detection of one or more events for monitoring one or more applications for one or more user equipment, UE, wherein each application is identified by an identifier and wherein the second notify message comprises the event report;

converting 1402 an event information comprised in the event report into a standard format; and sending 1403, via the Lawful Interception Handover Interface 2, LI_HI2, interface, the converted event information comprised in the event report to a Law Enforcement Monitoring Facility, LEMF.

Figure 15:
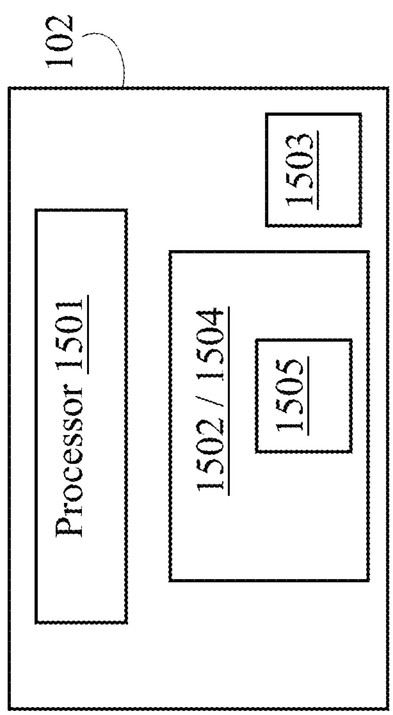
FIG. 15 illustrates the LI ADMF device according to one or more embodiments.

FIG. 15 is a block diagram illustrating an example of the LI ADMF device 102 comprising one or more processor(s) 1501 and a memory 1502, wherein the memory 1502 (or computer readable storage medium 1502) comprises instructions which when executed by the one or more processors 1501 cause the LI ADMF device 102 to perform one or more steps of the methods according to FIG. 9 and/or those illustrated by FIG. 3, FIG. 4 and FIG. 5. The LI ADMF device 102 is configured to receive requests and/or send responses over the interfaces, LI_X1 and LI_HI1, in accordance with predetermined protocols.

The computer program product 1504 comprises a computer program 1505, which comprises computer program code loadable into the processor 1501, wherein the computer program 1505 comprises code executed on the LI ADMF device 102 adapted to perform of one or more of the steps of the methods of FIG. 9 and the embodiments described herein, when the computer program code is executed by the processor 1501. In other words, the computer program 1505 may be the LI ADMF device 102 software hosted by the LI ADMF device 102. The interface circuitry 1503 of the LI ADMF device 102 is configured to receive requests and/or send responses over interface, LI_X1, and LI_HI1, in accordance with predetermined protocols.

Figure 16:
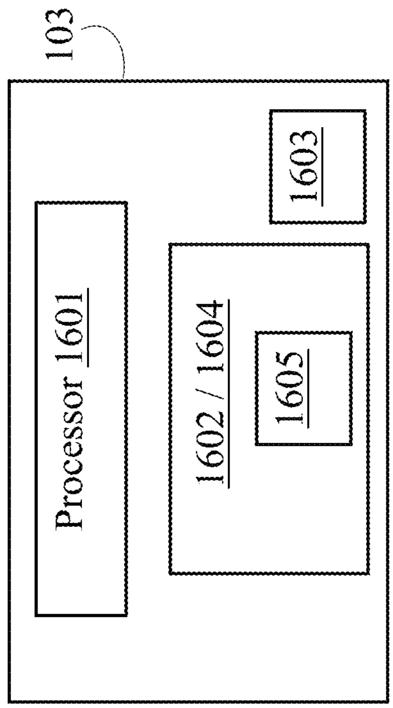
FIG. 16 illustrates the NEF device according to one or more embodiments.

FIG. 16 is a block diagram illustrating an example of the NEF device 103 comprising one or more processor(s) 1601 and a memory 1602, wherein the memory 1602 (or computer readable storage medium 1602) comprises instructions which when executed by the one or more processors 1601 cause the NEF device to perform one or more steps of the methods according to FIG. 10 and/or FIG. 13 and/or FIG. 5. The NEF device 103 is configured to receive requests and/or send responses, e.g. notify messages, over the interfaces, LI_X1, LI_X2 and Nnef, in accordance with predetermined protocols.

The computer program product 1604 comprises a computer program 1605, which comprises computer program code loadable into the processor 1601, wherein the computer program 1605 comprises code executed on the NEF device 103 adapted to perform of one or more of the steps of the methods of FIG. 10 and/or FIG. 13 and the embodiments described herein, when the computer program code is executed by the processor 1601. In other words, the computer program 1605 may be the NEF device 103 software hosted by the NEF device 103. The interface circuitry 1603 of the NEF device 103 is configured to receive requests and/or send responses, e.g. notify messages, over interface, LI_X1, LI_X2 and Nnef, in accordance with predetermined protocols.

Figure 17:
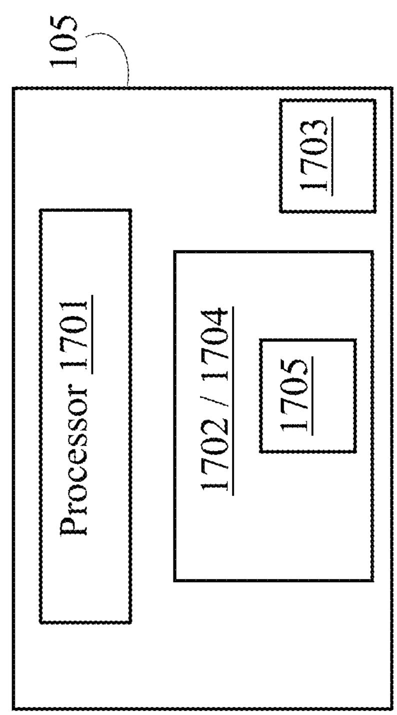
FIG. 17 illustrates the MDF2 device according to one or more embodiments.

FIG. 17 is a block diagram illustrating an example of the MDF2 device 105 comprising one or more processor(s) 1701 and a memory 1702, wherein the memory 1702 (or computer readable storage medium 1702) comprises instructions which when executed by the one or more processors 1701 cause the MDF2 device 105 to perform one or more steps of the methods according to FIG. 14. The interface 1703 of the MDF2 device 105 is configured to receive requests and/or send responses, e.g. notify messages, over the interfaces, LI_HI2 and LI_X2, in accordance with predetermined protocols.

The computer program product 1704 comprises a computer program 1705, which comprises computer program code loadable into the processor 1701, wherein the computer program 1705 comprises code executed on the MDF2 device 105 adapted to perform of one or more of the steps of the methods of FIG. 14 and the embodiments described herein, when the computer program code is executed by the processor 1701. In other words, the computer program 1705 may be an MDF2 software hosted by the MDF2 device 105. The MDF2 device 105 is configured to receive requests and/or send responses, e.g. notify messages, over interface, LI_HI2, LI_X1 internal and LI_X2, in accordance with predetermined protocols.

Figure 18:
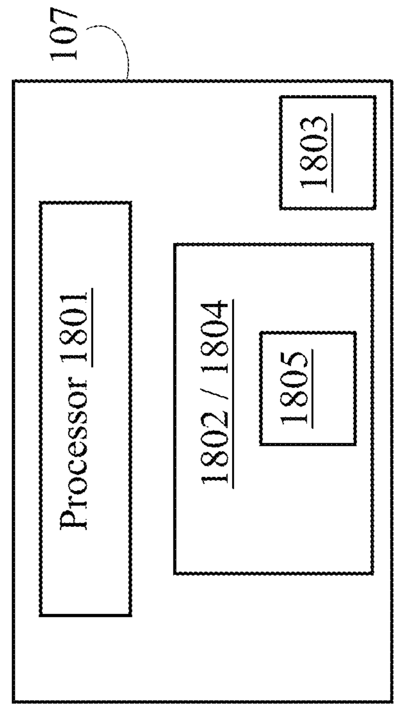
FIG. 18 illustrates the AF device according to one or more embodiments.

FIG. 18 is a block diagram illustrating an example of the AF device 107 comprising one or more processor(s) 1801 and a memory 1802, wherein the memory 1802 (or computer readable storage medium 1802) comprises instructions which when executed by the one or more processors 1801 cause the AF device 107 to perform one or more steps of the methods according to FIG. 11 and FIG. 12. The AF device 107 is configured to receive requests and/or send responses, e.g. notify messages, over the interface Naf in accordance with predetermined protocols.

The computer program product 1804 comprises a computer program 1805, which comprises computer program code loadable into the processor 1801, wherein the computer program 1805 comprises code executed on the AF device 107 adapted to perform of one or more of the steps of the methods of FIG. 11 and FIG. 12 and the embodiments described herein, when the computer program code is executed by the processor 1801. In other words, the computer program 1805 may be an AF software hosted by the AF device 107. The AF device 107 is configured to receive requests and/or send responses, e.g. notify messages, over interface Naf in accordance with predetermined protocols.

The devices, namely the LI ADMF device 102, the NEF device 103, the MDF2 device 105, the AF device 107 according to FIG. 15, FIG. 16, FIG. 17 and FIG. 18 respectively, may have storage and/or processing capabilities. The LI ADMF device 102, the NEF device 103, the MDF2 device 105, the AF device 107 may include one or more processors 1501, 1601, 1701,1801 respectively and memory 1502, 1602, 1702, 1802 respectively. In particular, in addition to a traditional processor and memory, the LI ADMF device 102, the NEF device 103, the MDF2 device 105, the AF device 107 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor(s) 1501, 1601, 1701, 1801 may be configured to access (e.g., write to and/or read from) the memory 1502, 1602, 1702, 1802 respectively, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The LI ADMF device 102, the NEF device 103, the MDF2 device 105, the AF device 107 may be configured to control any of the methods and/or processes described herein and/or to cause such methods, and/or processes to be performed. Processor 1501, 1601, 1701, 1801 corresponds to one or more processors 1501, 1601, 1701, 1801 respectively, for performing the LI ADMF device 102, the NEF device 103, the MDF2 device 105, the AF device 107 functions described herein. The LI ADMF device 102, the NEF device 103, the MDF2 device 105, the AF device 107 includes memory 1502, 1602, 1702, 1802 or computer readable storage mediums 1502, 1602, 1702, 1802 respectively, that is configured to store data, programmatic software code and/or other information described herein. The memory 1502, 1602, 1702, 1802 may include instructions which, when executed by the one or more processors 1501, 1601, 1701, 1801 respectively, cause the one or more processors 1501, 1601, 1701, 1801 to perform the processes described herein with respect to the LI ADMF device 102, the NEF device 103, the MDF2 device 105, the AF device 107 respectively. The instructions may be software (SW) or computer program associated with the LI ADMF device 102, the NEF device 103, the MDF2 device 105, the AF device 107.

Thus, the LI ADMF device 102, the NEF device 103, the MDF2 device 105, the AF device 107 may further comprise SW or computer program, which is stored in, for example, the memory 1502, 1602, 1702, 1802 at the LI ADMF device 102, the NEF device 103, the MDF2 device 105, the AF device 107 respectively, or stored in external memory (e.g., database) accessible by the LI ADMF device 102, the NEF device 103, the MDF2 device 105, the AF device 107 respectively. The SW or computer program may be executable by the one or more processors 1501, 1601, 1701, 1801.

Computer program product 1504, 1604, 1704, 1804 may be or comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by one or more processors 1501, 1601, 1701, 1801. The computer program product 1504, 1604, 1704, 1804 may store any suitable instructions, data or information, including a computer program, software, an application including one or more of logic, rules, code, tables, etc. and/or other instructions capable of being executed by one or more processors 1501, 1601, 1701, 1801, memory 1502, 1602, 1702, 1802 may be used to store any calculations made by one or more processors 1501, 1601, 1701, 1801 respectively. In some embodiments, one or more processors 1501, 1601, 1701, 1801 and the computer program product 1504, 1604, 1704, 1804 may be considered to be integrated.

ABBREVIATION

3GPP 3rd Generation Partnership Project
5G Fifth generation of cellular mobile communications
5GS 5G System
AMF Access and Mobility Management Function
CC Content of Communication
CP Control Plane
CSP Communication Service Provider
DNN Data Network Name
ETSI European Telecommunications Standards Institute
GPSI Generic Public Subscription Identifier
HTTP HyperText Transfer Protocol
HTTPS HTTP over TLS
IoT Internet of Things
IP Internet Protocol
IRI Intercept Related Information
LEMF Law Enforcement Monitoring Facility
LI Lawful Interception
LI ADMF Lawful Interception Administration Function
LICF Lawful Interception Control Function
LIID Lawful Interception Identifier
LIPF Lawful Interception Provisioning Function
LI_HI1 Lawful Interception Handover Interface 1
LI_HI2 Lawful Interception Handover Interface 2
LI_SI Lawful Interception System Information Interface
LI_X1 Lawful Interception Internal Interface 1
LI_X2 Lawful Interception Internal Interface 2
MDF Mediation Function
NE Network Element
NEF Network Exposure Function
NF Network Function
NFV Network Function Virtualization
NIDD Non-IP Data Delivery
PDU Protocol Data Unit
PEI Permanent Equipment Identifier
POI Point Of Interception
RAM Random Access Memory
RAN Radio Access Network
ROM Read Only memory
SBA Service-Based Architecture
SIRF System Information Retrieval Function
SMF Session Management Function
S-NSSAI Single-Network Slice Selection Assistance Information
SUPI Subscriber Permanent Identifier
TLS Transport Layer Security
UE user Equipment
VNF Virtual Network Function
xCC X3 Content of Communication
xIRI X2 Intercept Related Information

The invention claimed is:

1. A Lawful Interception Administration Function, LI ADMF device comprising a memory and a processor, the memory containing instructions which when executed on the processor, cause the LI ADMF device to:

send to a Network Repository Function, NRF, a discovery request message for discovering at least one Network Exposure Function, NEF, device and at least one Application Function, AF, device served by the NEF device;

receive from the NRF, a discovery response message comprising information about the NEF device and information about the AF device, served by the NEF device;

receive from a Law Enforcement Agency, LEA, a first request message for subscribing to a notification of at least one event for monitoring a list of applications for at least one user equipment, UE, wherein the notification of the event is provided by the AF device and wherein an application in the list is either determined to pose a threat to the UE or is trusted by the UE;

send a second request message, to a NEF device which comprises an Intercept Related Information Point of Interception, IRI-POI, to subscribe to the notification of the event, wherein the NEF device is identified based on the information comprised in the discovery response message; and receive a subscribe response message from the NEF device confirming the subscription to the notification of the event.

2. The LI ADMF device according to claim 1, wherein the first request message comprises an LITaskObject comprising a target identifier wherein the target identifier is an application identifier, AppID, identifying an application to be monitored.

3. The LI ADMF device according to claim 1, wherein the first request message comprises an LITaskObject comprising a target identifier wherein the target identifier is a list of application identifiers, AppIDs, each identifying an application to be monitored.

4. The LI ADMF device according to claim 1, wherein the first request message and/or the second request message comprises an EventFilter information comprising an application identifier, AppID, identifying an application to be monitored.

5. The LI ADMF device according to claim 1, wherein the first request message and/or the second request message comprises an EventFilter information comprising a list of application identifiers, AppIDs, each identifying an application to be monitored.

6. The LI ADMF device according to claim 1, wherein the Event Filter information comprises, for identifying an application to be monitored, at least one of: a Generic Public Subscription Identifier, GPSI, a Subscriber Permanent Identifier, SUPI, External Group Identifiers, exterGroupIds, Internal Group Identifiers, interGroupIds, any UE Identifier, anyUeInd and Location Area Identifier, locArea.

7. The LI ADMF device according to claim 1, wherein the event for monitoring is at least one of: UeCommunication, UeMobility and ServiceExperience.

8. The LI ADMF device according to claim 7, wherein the UeCommunication is indicated by a feature name UECOMM that indicates the event related to UE communication information.

9. The LI ADMF device according to claim 7, wherein the UeMobility is indicated by a feature name UEMOBILITY that indicates the event related to UE mobility.

10. The LI ADMF device (102) according to claim 7, wherein the ServiceExperience is indicated by a feature name SVC that indicates an event related to service experience.

11. The LI ADMF device according to claim 1, wherein the first request message and the second request message comprises the event for monitoring, the event indicated by the corresponding feature name.

12. The LI ADMF device according to claim 1, wherein the discovery request message comprises a request of type NEF.

13. The LI ADMF device according to claim 1, wherein the information about the NEF device includes at least one of: NEF ID and NEF address.

14. The LI ADMF device according to claim 1, wherein the information about the AF device includes information on whether the AF device is connected to the NEF device.

15. The LI ADMF device according to claim 14, wherein the information about the AF device includes a list of application identifiers, AppIds monitored by the AF device that are connected to the NEF device.

16. The LI ADMF device according to claim 1, the memory containing instructions which when executed on the processor, cause the LI ADMF device to:

send a subscription request message for subscribing to a notification about a change in status of the NEF device; and receive a subscription response message confirming the subscription to the notification about the change in status.

17. A method performed by a Lawful Interception Administration Function, LI ADMF, device, the method comprising:

sending to a Network Repository Function, NRF, a discovery request message for discovering at least one Network Exposure Function, NEF, device and at least one Application Function, AF, device served by the NEF device;

receiving from the NRF, a discovery response message comprising information about the NEF device and information about the AF device, served by the NEF device;

receiving from a Law Enforcement Agency, LEA, a first request message for subscribing to a notification of at least one event for monitoring a list of applications for at least one user equipment, UE, wherein the notification of the event is provided by the AF device and wherein an application in the list is either determined to pose a threat to the UE or is trusted by the UE;

sending a second request message, to a NEF device which comprises an Intercept Related Information Point of Interception, IRI-POI, to subscribe to the notification of the event, wherein the NEF device is identified based on the information comprised in the discovery response message; and receiving a subscribe response message from the NEF device confirming the subscription to the notification of the event.

18. A computer program, comprising instructions which, are stored and executed on a Lawful Interception Administration Function, LI ADMF, device, causing the LI ADMF device to carry out the method according to claim 17.

* * * * *